(12) United States Patent
Takaki et al.

(10) Patent No.: US 12,184,931 B2
(45) Date of Patent: Dec. 31, 2024

(54) ARTIFICIAL INTELLIGENCE INFORMATION PROCESSING DEVICE AND ARTIFICIAL INTELLIGENCE INFORMATION PROCESSING METHOD

(71) Applicant: SONY GROUP CORPORATION, Tokyo (JP)

(72) Inventors: Goro Takaki, Tokyo (JP); Yoshiyuki Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 23 days.

(21) Appl. No.: 17/610,476

(22) PCT Filed: Mar. 9, 2020

(86) PCT No.: PCT/JP2020/009957
§ 371 (c)(1),
(2) Date: Nov. 11, 2021

(87) PCT Pub. No.: WO2020/240976
PCT Pub. Date: Dec. 3, 2020

(65) Prior Publication Data
US 2022/0224980 A1      Jul. 14, 2022

(30) Foreign Application Priority Data
May 27, 2019   (JP) .................................. 2019-098472

(51) Int. Cl.
*H04N 21/442*     (2011.01)
*H04N 21/44*      (2011.01)
*H04N 21/466*     (2011.01)

(52) U.S. Cl.
CPC . *H04N 21/44218* (2013.01); *H04N 21/44008* (2013.01); *H04N 21/4666* (2013.01)

(58) Field of Classification Search
None
See application file for complete search history.

(56) References Cited

U.S. PATENT DOCUMENTS 10,306,311 B1 *   5/2019   Knas ................. H04N 21/44218
11,353,955 B1 *   6/2022   Burgess .................. G06T 7/246
(Continued)

FOREIGN PATENT DOCUMENTS

JP      2005-142975 A     6/2005
JP      2007-143010 A     6/2007
(Continued)

OTHER PUBLICATIONS

International Search Report and Written Opinion of PCT Application No. PCT/JP2020/009957, issued on May 26, 2020, 08 pages of ISRWO.

*Primary Examiner* — Alexander Q Huerta
(74) *Attorney, Agent, or Firm* — CHIP LAW GROUP

(57) ABSTRACT

An artificial intelligence information processing device that generates information about a scene according to artificial intelligence is provided. The artificial intelligence information processing device includes a gaze degree estimation unit configured to estimate a degree of gaze of a user who is watching content according to artificial intelligence on the basis of sensor information, an acquisition unit configured to acquire a video of a scene at which the user gazes in the content and information about the content on the basis of an estimation result of the gaze degree estimation unit, and a scene information estimation unit configured to estimate information about the scene at which the user gazes according to artificial intelligence on the basis of the video of the scene at which the user gazes and the information about the content.

10 Claims, 19 Drawing Sheets

(56) References Cited

U.S. PATENT DOCUMENTS

| | | | |
|---|---|---|---|
| 2007/0300258 A1* | 12/2007 | O'Connor | H04N 21/44204 725/44 |
| 2012/0146891 A1* | 6/2012 | Kalinli | H04N 19/33 345/156 |
| 2013/0290904 A1* | 10/2013 | Hinman | H04N 21/4667 715/835 |
| 2018/0007431 A1* | 1/2018 | Sidhu | H04N 21/42203 |
| 2018/0288477 A1* | 10/2018 | Gupta | H04N 21/4532 |
| 2018/0300751 A1* | 10/2018 | Hammitt | G06V 30/19173 |
| 2018/0357317 A1* | 12/2018 | Santiago | H04N 21/4828 |
| 2020/0045363 A1* | 2/2020 | Nellore | H04N 21/812 |
| 2020/0086879 A1* | 3/2020 | Lakshmi Narayanan | G06V 20/597 |
| 2020/0273485 A1* | 8/2020 | Jagmag | G06N 3/047 |
| 2020/0275158 A1* | 8/2020 | Gaur | G06N 3/08 |

FOREIGN PATENT DOCUMENTS

| | | | |
|---|---|---|---|
| JP | 2008-236779 A | 10/2008 | |
| JP | 2011-239158 A | 11/2011 | |
| JP | 4840393 B | 12/2011 | |
| JP | 2018-205819 A | 12/2018 | |
| WO | 2017/120469 A1 | 7/2017 | |

\* cited by examiner

ARTIFICIAL INTELLIGENCE INFORMATION PROCESSING DEVICE AND ARTIFICIAL INTELLIGENCE INFORMATION PROCESSING METHOD

TECHNICAL FIELD

A technology disclosed in the present description relates to an artificial intelligence information processing device and an artificial intelligence information processing method for processing information about content according to artificial intelligence.

BACKGROUND ART

Television broadcasting services have been in wide use for a long time. Because television receivers are currently widespread, one or more receivers have been installed in each home. Recently, broadcasting type moving image distribution services using a network, such as Internet protocol TV (IPTV) and over-the-top (OTT), have also been spreading.

Furthermore, a technology for combining a television receiver and a sensing technology to measure "viewing and listening quality" indicating a degree of gaze of a viewer at video content has also been researched and developed recently (refer to PTL 1, for example). There are various methods of using viewing and listening quality. For example, it is possible to evaluate effects of video content and advertisements and to recommend other content and products to viewers on the basis of results of measurement of viewing and listening quality.

CITATION LIST

Patent Literature

[PTL 1]
WO 2017/120469
[PTL 2]
JP 4840393 B
[PTL 3]
JP 2007-143010 A
[PTL 4]
JP 2008-236779 A

SUMMARY

Technical Problem

An object of a technology disclosed in the present description is to provide an artificial intelligence information processing device and an artificial intelligence information processing method for processing information associated with content according to artificial intelligence.

Solution to Problem

A first aspect of a technology disclosed in the present description is an artificial intelligence information processing device including a gaze degree estimation unit configured to estimate a degree of gaze of a user who is watching content according to artificial intelligence on the basis of sensor information, an acquisition unit configured to acquire a video of a scene at which the user gazes in the content and information about the content on the basis of an estimation result of the gaze degree estimation unit, and a scene information estimation unit configured to estimate information about the scene at which the user gazes according to artificial intelligence on the basis of the video of the scene at which the user gazes and the information about the content.

The scene information estimation unit estimates information having a correlation with the scene at which the user gazes using a neural network that has learned correlations between video of scenes and the information about the content and information about the scenes as estimation according to artificial intelligence.

Furthermore, the gaze degree estimation unit estimates a degree of gaze having a correlation with sensor information about the user who is watching the content using a neural network that has learned correlations between sensor information and degrees of gaze of the user as estimation according to artificial intelligence.

In addition, a second aspect of the technology disclosed in the present description is an artificial intelligence information processing device including an input unit configured to receive sensor information about a user who is watching content and a scene information estimation unit configured to estimate information having a correlation with a scene at which the user gazes using a neural network that has learned correlations between sensor information, content and information on the content, and information about scenes at which the user gazes.

In addition, a third aspect of the technology disclosed in the present description is an artificial intelligence information processing method including a gaze degree estimation step for estimating a degree of gaze of a user who is watching content according to artificial intelligence on the basis of sensor information, an acquisition step for acquiring a video of a scene at which the user gazes in the content and information about the content on the basis of an estimation result in the gaze degree estimation step, and a scene information estimation step for estimating information about the scene at which the user gazes according to artificial intelligence on the basis of the video of the scene at which the user gazes and the information about the content.

Advantageous Effects of Invention

According to the technology disclosed in the present description, it is possible to provide an artificial intelligence information processing device and an artificial intelligence information processing method for estimating metadata with respect to a scene of a part of content according to artificial intelligence.

Meanwhile, the effects described in the present description are merely illustrative and effects provided by the technology disclosed in the present description are not limited thereto. In addition, the technology disclosed in the present description may further obtain additional effects in addition to the aforementioned effects.

Other objects, features, and advantages of the technology disclosed in the present description will become clear according to detailed description based on embodiments which will be described later and the attached drawings.

DESCRIPTION OF EMBODIMENTS

Hereinafter, embodiments of a technology disclosed in the present description will be described in detail with reference to the drawings.

A. System Configuration

Figure 1:
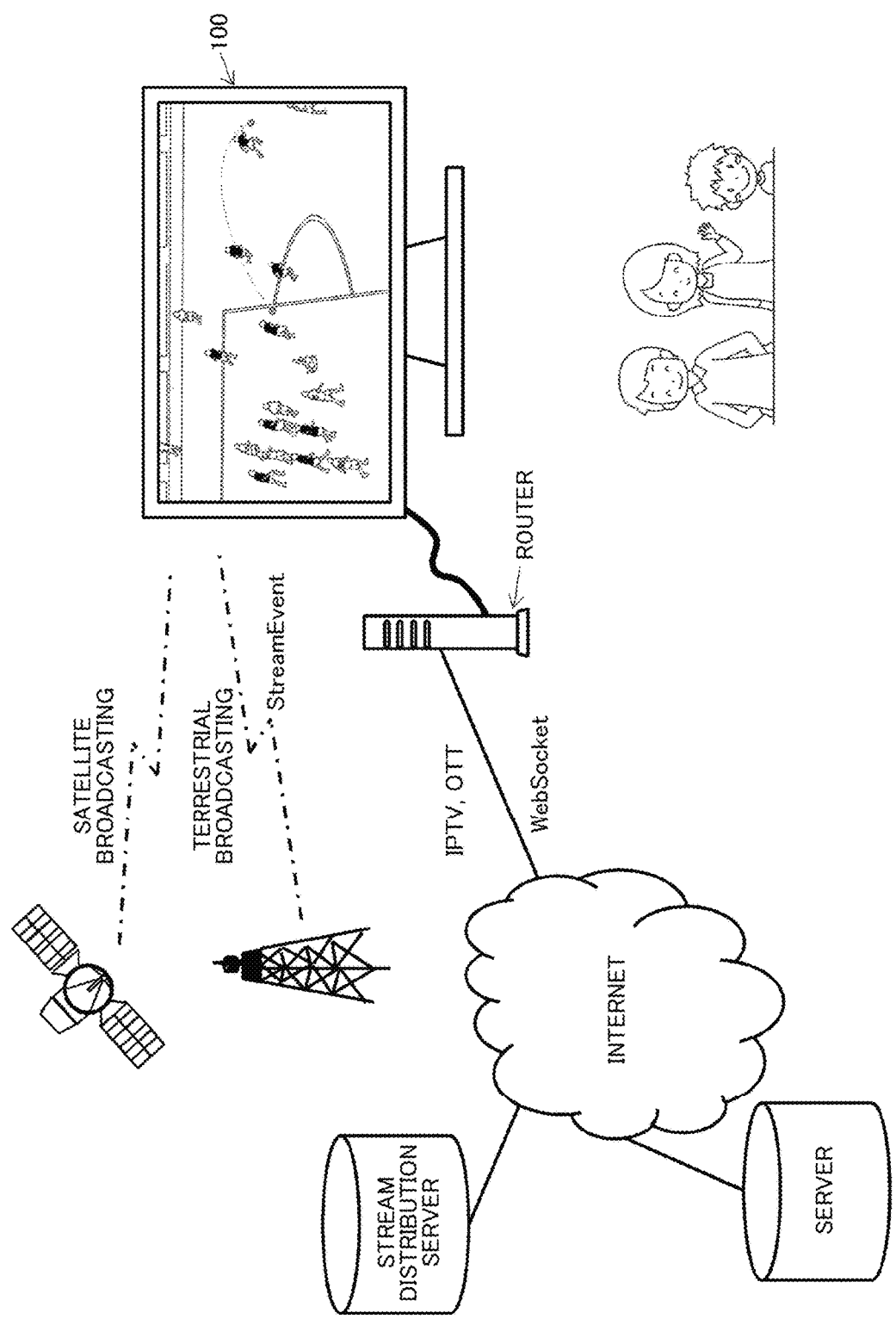
FIG. 1 is a diagram illustrating a configuration example of a system used to watch video content.

FIG. 1 schematically illustrates a configuration example of a system used to watch video content.

A television receiving device 100 is equipped with a large screen that display video content and a speaker that outputs sound. The television receiving device 100 includes a tuner for selecting and receiving broadcast signals or is connected to a set-top box, for example, and thus can use broadcasting services provided by television stations. Broadcast signals may be any of ground waves and satellite waves.

In addition, the television receiving device 100 can also use, for example, broadcasting type moving image distribution services using networks such as IPTV and OTT. Accordingly, the television receiving device 100 is equipped with a network interface card and connected to an external network such as the Internet via a router or an access point using communication based on existing communication standards such as Ethernet (registered trademark) and Wi-Fi (registered trademark).

A stream distribution server that distributes video streams is provided on the Internet and provides a broadcasting type moving image distribution service to the television receiving device 100.

In addition, innumerable servers that provide various services are provided on the Internet. An example of a server is the stream distribution server. On the side of the television receiving device 100, it is possible to start a browser function and issue, for example, a Hyper Text Transfer Protocol (HTTP) request for the stream distribution server to use web services.

Further, it is assumed that an artificial intelligence server (not illustrated) that provides artificial intelligence functions to clients on the Internet (or on a cloud) also exists in the present embodiment. Here, the artificial intelligence functions are, for example, functions obtained by artificially realizing, by software or hardware, general functions of the human brain, such as learning, inference, data creation, and planning. In addition, for example, a neural network that performs deep learning (DL) according to a model imitating the human brain neural circuit is mounted in the artificial intelligence server. The neural network includes a mechanism in which artificial neurons (nodes) forming a network according to synapse combination obtain the ability to solve problems while changing synapse combination strength according to learning. The neural network can automatically infer a problem solving rule by iterating learning. Meanwhile, "artificial intelligence server" mentioned in the present description is not limited to a single server device and may have, for example, the form of a cloud that provides a cloud computing service.

Figure 2:
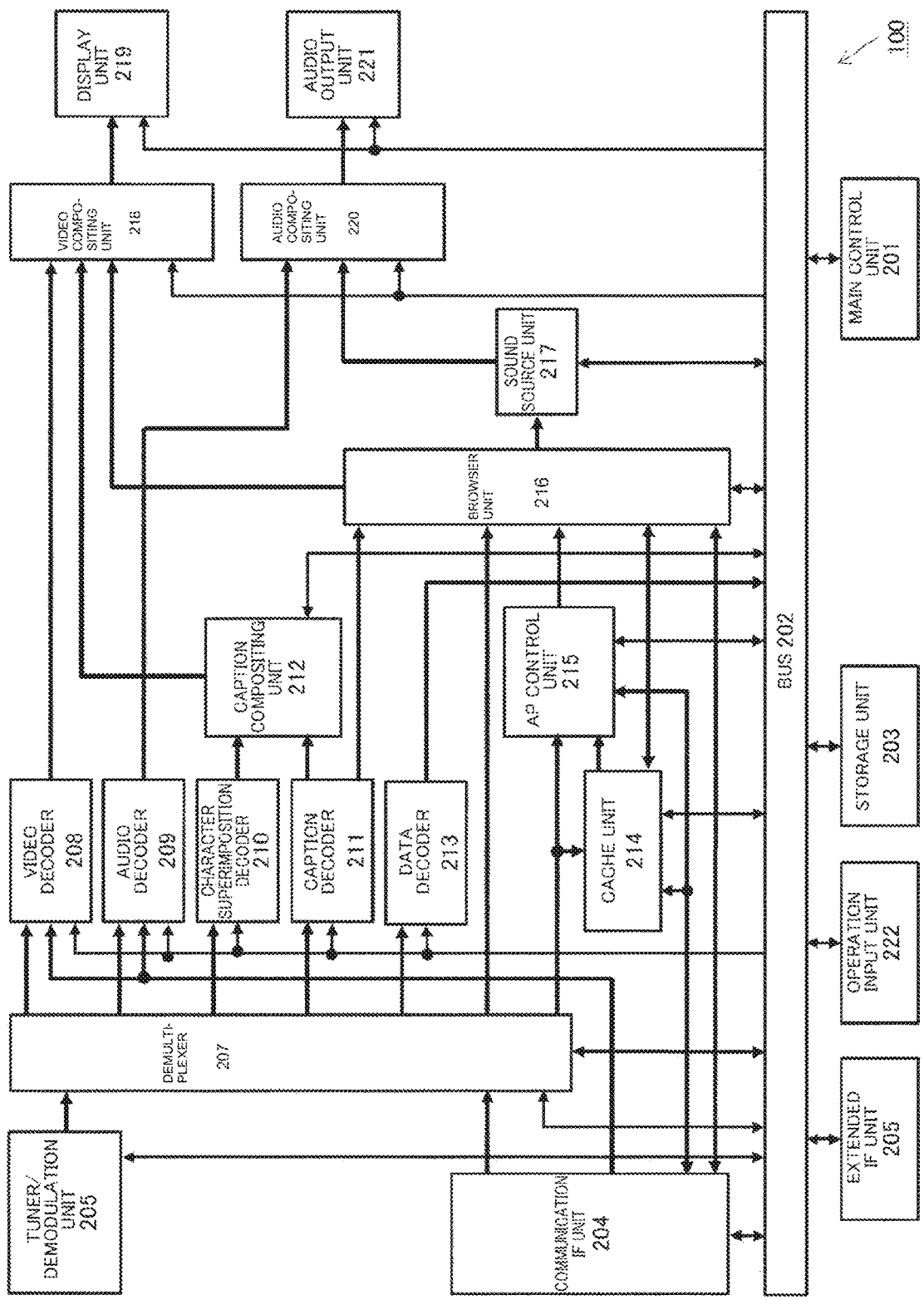
FIG. 2 is a diagram illustrating a configuration example of a television receiving device 100.

FIG. 2 illustrates a configuration example of the television receiving device 100. The television receiving device 100 includes a main control unit 201, a bus 202, a storage unit 203, a communication interface (IF) unit 204, an extended interface (IF) unit 205, a tuner/demodulation unit 206, a demultiplexer (DEMUX) 207, a video decoder 208, an audio decoder 209, a character superimposition decoder 210, a caption decoder 211, a caption compositing unit 212, a data decoder 213, a cache unit 214, an application (AP) control unit 215, a browser unit 216, a sound source unit 217, a video compositing unit 218, a display unit 219, an audio compositing unit 220, an audio output unit 221, and an operation input unit 222.

The main control unit 201 includes, for example, a controller, a read only memory (ROM) (which is assumed to include a rewritable ROM such as an electrically erasable programmable ROM (EEPROM)), and a random access memory (RAM) and generally controls overall operation of the television receiving device 100 according to a predetermined operation program. The controller is a central processing unit (CPU), a micro-processing unit (MPU), a graphics processing unit (GPU), a general purpose graphic processing unit (GPGPU), or the like, and the ROM is a nonvolatile memory in which a basic operation program such as an operating system (OS) and other operation programs are stored. Operation setting values necessary for operation of the television receiving device 100 may be stored in the ROM. The RAM is a work area for when the OS and other operation programs are executed. The bus 202 is a data communication path for performing transmission/ reception of data between the main control unit 201 and each component in the television receiving device 100.

The storage unit 203 is configured as a nonvolatile storage device such as a flash ROM, a solid state drive (SSD), or a hard disc drive (HDD). The storage unit 203 stores operation programs and operation setting values of the television receiving device 100, personal information of a user who uses the television receiving device 100, and the like. In addition, the storage unit 203 stores operation programs downloaded through the Internet, various types of data created by the operation programs, and the like. Further, the storage unit 203 can also store content such as moving images, still images, and sound acquired through broadcast signals and the Internet.

The communication interface unit 204 is connected to the Internet via a router (described above) or the like to perform transmission/reception of data to/from each server device on the Internet or other communication apparatuses. In addition, the communication interface unit 204 is assumed to acquire data streams of programs transmitted through a communication line. The router may be any of wired connection such as Ethernet (registered trademark) and wireless connection such as Wi-Fi (registered trademark).

The tuner/demodulation unit 206 receives broadcast waves such as terrestrial broadcasting or satellite broadcasting through an antenna (not illustrated) and tunes in to (selects) a channel of a service (broadcasting station or the like) that a user desires on the basis of control of the main control unit 201. In addition, the tuner/demodulation unit 206 demodulates a received broadcast signal to acquire a broadcast data stream. Meanwhile, a configuration in which a plurality of tuner/demodulation units are mounted in the television receiving device 100 (i.e., multiples tuners) may be employed for the purpose of simultaneously displaying a plurality of screens, recording programs on different channels, and the like.

The demultiplexer 207 respectively distributes a video data stream, an audio data stream, a character-superimposed data stream, and a caption data stream that are real-time presentation elements to the video decoder 208, an audio decoder 209, a character superimposition decoder 210, and a caption decoder 211 on the basis of a control signal in data streams input thereto. The data streams input to the demultiplexer 207 include a broadcast data stream according to a broadcasting service and a distribution data stream according to a distribution service such as IPTV or OTT. The former is input to the demultiplexer 207 after being selected, received and demodulated by the tuner/demodulation unit 206 and the latter is input to the demultiplexer 207 after being received by the communication interface unit 204. In addition, the demultiplexer 207 reproduces a multimedia application or file data that is a component thereof and outputs it to the application control unit 215 or temporarily stores it in the cache unit 214.

The video decoder 208 decodes a video stream input from the demultiplexer 207 and outputs video information. In addition, the audio decoder 209 decodes an audio stream input from the demultiplexer 207 and outputs audio information. In digital broadcasting, a video stream and an audio stream encoded according to, for example, an MPEG2 system standard are multiplexed and transmitted or distributed. The video decoder 208 and the audio decoder 209 perform decoding processing on the encoded video stream and the encoded video stream demultiplexed by the demultiplexer 207 according to standardized decoding methods. Meanwhile, the television receiving device 100 may include a plurality of video decoders 208 and audio decoders 143 in order to simultaneously decode a plurality of types of video data streams and audio data streams.

The character superimposition decoder 210 decodes character-superimposed data stream input from the demultiplexer 207 and outputs character-superimposed information. The caption decoder 211 decodes a caption data stream input from the demultiplexer 207 and outputs caption information. The caption compositing unit 212 performs compositing processing on the character-superimposed information output from the character superimposition decoder 210 and the caption information output from the caption decoder 211.

The data decoder 213 decodes a data stream obtained by multiplexing video data and audio data in an MPEG-2 TS stream. For example, the data decoder 213 notifies the main control unit 201 of a result of decoding of a general-purpose event message stored in a descriptor region of a program map table (PMT) that is one of the program specific information (PSI) tables.

The application control unit 215 receives control information included in a broadcast data stream from the demultiplexer 207 or acquires the control information from a server device on the Internet via the communication interface unit 204 and interprets the control information.

The browser unit 216 presents a multimedia application file or file data that is a component thereof acquired from the server device on the Internet via the cache unit 214 of the communication interface unit 204 according to an instruction of the application control unit 215. The multimedia application file mentioned here may be, for example, a Hyper Text Markup Language (HTML) document, a Broadcast Markup Language (BML) document, or the like. In addition, the browser unit 216 also performs reproduction of audio information of an application by acting on the sound source unit 217.

The video compositing unit 218 receives video information output from the video decoder 208, caption information output from the caption compositing unit 212, and application information output from the browser unit 216 and performs processing of appropriately selecting or superimposing the information. The video compositing unit 218 includes a video RAM (illustration thereof is omitted), and display of the display unit 219 is driven on the basis of video information input to the video RAM. In addition, the video compositing unit 218 also performs processing of superimposing an electronic program guide (EPG) screen and screen information such as graphics generated by an application executed by the main control unit 201 on the basis of control of the main control unit 201 as necessary.

The display unit 219 is a display device configured as, for example, a liquid crystal display, an organic electroluminescence (EL) display, or the like and presents video information on which selection or superimposition processing has been performed by the video compositing unit 218 to a user. In addition, a liquid crystal display device of a type in which a transmissive type liquid crystal panel is segmented into a plurality of display regions (blocks) which individually cause light to be incident using a backlight for each display region (refer to PTL 2, for example) may be used as the display unit 219. This type of display device has the advantage of controlling the amount of incident light for each display region to extend a dynamic range of luminance of a displayed image.

The audio compositing unit 220 receives audio information output from the audio decoder 209 and audio information of an application reproduced by the sound source unit 217 and performs processing such as appropriately selecting or compositing the audio information.

The audio output unit 221 is used for audio output of program content or data broadcast content selected and received by the tuner/demodulation unit 206 and output of audio information (including composite audio of audio guidance or an audio agent, and the like) processed by the audio compositing unit 220. The audio output unit 221 is configured as a sound generation element such as a speaker. For example, the audio output unit 221 may be a speaker array (a multi-channel speaker or a super-multi-channel speaker) configured as a combination of a plurality of speakers or some or all speakers may be externally connected to the television receiving device 100.

Figure 19:
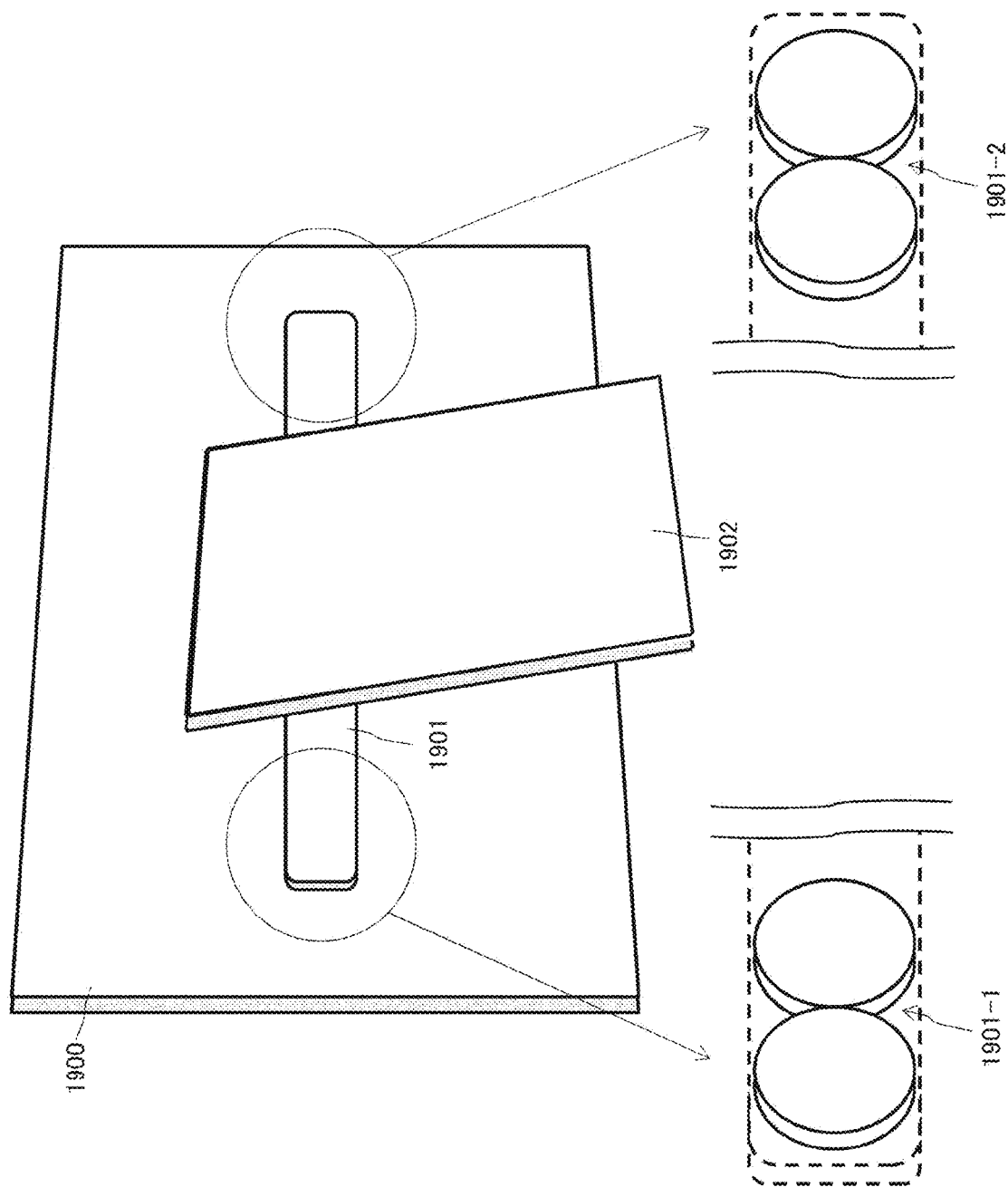
FIG. 19 is a diagram illustrating an example of application of a panel speaker technology.

A flat panel type speaker (refer to PTL 3, for example) can be used for the audio output unit 221 in addition to a cone type speaker. Of course, a speaker array configured as a combination of different types of speakers can also be used as the audio output unit 221. In addition, a speaker array may include a speaker array that performs audio output by vibrating the display unit 219 using one or more exciters (actuators) generating vibration. An exciter (actuator) may have a form attached to the back of the display unit 219. FIG. 19 illustrates an example of application of a panel speaker technology to a display. A display 1900 is supported by a stand 1902 at the rear thereof. A speaker unit 1901 is attached to the rear of the display 1900. An exciter 1901-1 is provided at the left edge of the speaker unit 1901 and an exciter 1901-2 is provided at the right edge thereof to constitute a speaker array. The exciters 1901-1 and 1901-2 can vibrate the display 1901 on the basis of left and right audio signals to output sound. The stand 1902 may include a built-in subwoofer that outputs lower-register sound. Meanwhile, the display 1900 corresponds to the display unit 219 using an organic EL element.

Referring back to FIG. 2, the configuration of the television receiving device 100 will be described. The operation input unit 222 is an instruction input unit by which a user inputs an operation instruction for the television receiving device 100. The operation input unit 222 includes, for example, a remote controller receiving unit that receives a command transmitted from a remote controller (not illustrated) and an operation key in which button switches are arranged. In addition, the operation input unit 222 may include a touch panel superimposed on a screen of the display unit 219. Further, the operation input unit 222 may include an external input device such as a keyboard connected to the extended interface unit 205.

The extended interface unit 205 is an interface group for extending the function of the television receiving device 100 and includes, for example, an analog video/audio interface, a Universal Serial Bus (USB) interface, a memory interface, and the like. The extended interface unit 205 may include a digital interface composed of a DVI terminal, an HDMI (registered trademark) terminal, a Display Port (registered trademark) terminal, and the like.

In the present embodiment, the extended interface 205 is also used as an interface for taking in sensor signals of various sensors included in a sensor group (which will be described later with reference to FIG. 3). It is assumed that the sensors include both sensors installed in the main body of the television receiving device 100 and sensors externally connected to the television receiving device 100. The externally connected sensors also include sensors built in other consumer electronics (CE) apparatuses and Internet of things (IoT) devices present in the same space as the television receiving device 100. The extended interface 205 may take in a sensor signal after performing signal processing such as noise removal and digital conversion thereon or take in the sensor signal as unprocessed RAW data (analog waveform signal).

B. Sensing Function

One purpose for which the television receiving device 100 is equipped various sensors to measure or estimate a degree of gaze (viewing and listening quality) when a user watches video content displayed on the display unit 219. In general, if a degree of satisfaction with video content is high, a degree of gaze at a specific scene also tends to increase. Accordingly, a degree of gaze can also be called "degree of satisfaction" with video content. That is, it is assumed that "degree of gaze" appearing in the present description is synonymous with the expression "degree of satisfaction". Further, when simply a "user" is mentioned in the present description, it is assumed that it refers to a viewer who watches video content displayed on the display unit 219 (also including a case in which the viewer plans to watch it) unless it is more particularly specified.

Figure 3:
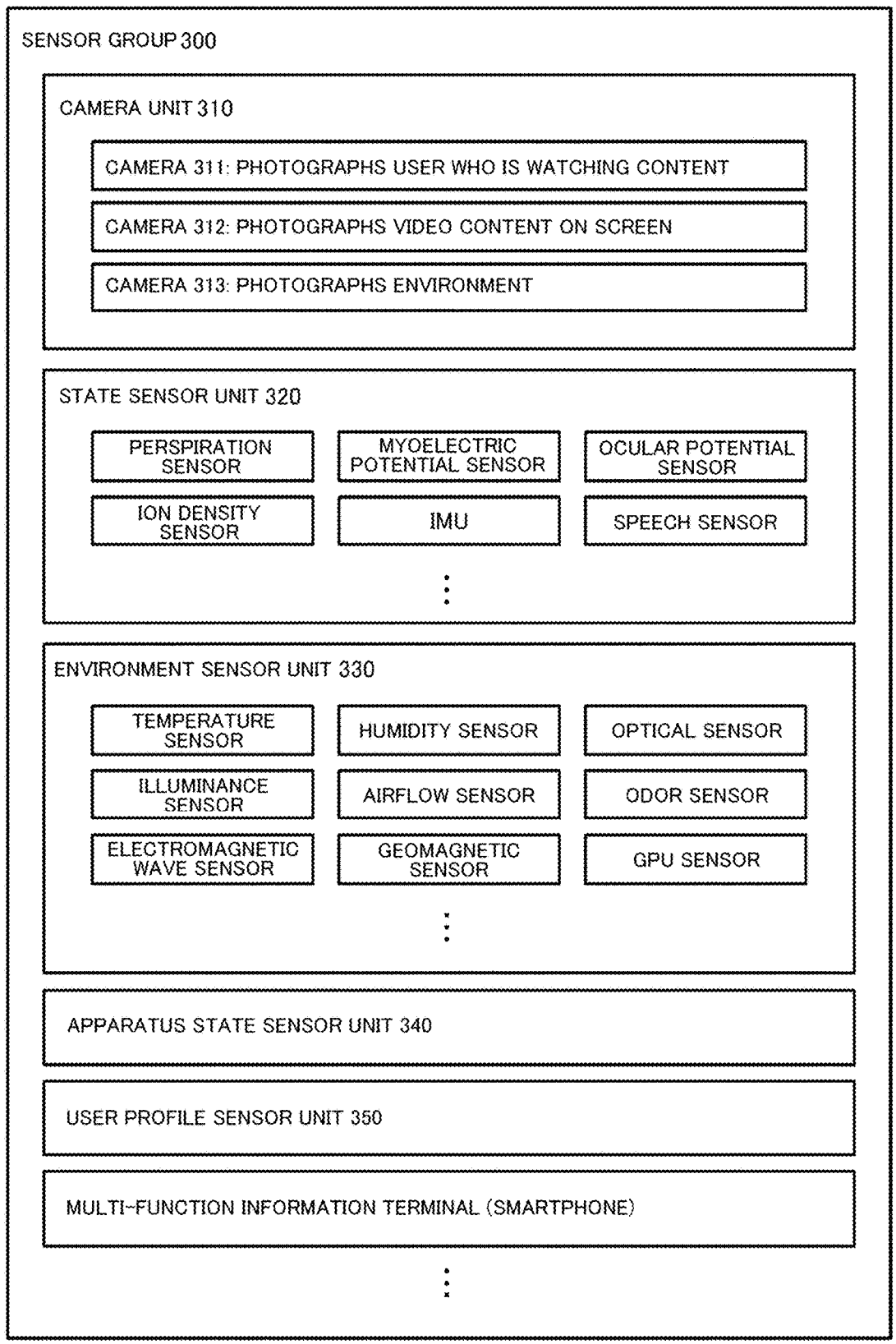
FIG. 3 is a diagram illustrating a configuration example of a sensor group 300 installed in the television receiving device 100.

FIG. 3 illustrates a configuration example of a sensor group 300 installed in the television receiving device 100. The sensor group 300 includes a camera unit 310, a state sensor unit 320, an environment sensor unit 330, an apparatus state sensor unit 340, and a user profile sensor unit 350.

The camera unit 310 includes a camera 311 that photographs a user who is watching video content displayed on the display unit 219, a camera 312 that photographs video content displayed on the display unit 219, and a camera 313 that photographs an indoor space in which the television receiving device 100 is installed (or an installation environment).

The camera 311 is provided, for example, near the center of the upper edge of the screen of the display unit 219 and suitably photographs a user who is watching video content. It is assumed that the camera 311 is essential in the present embodiment.

The camera 312 is provided, for example, to face the screen of the display unit 219 and photographs video content that is being watched by a user. Alternatively, the user may put on goggles in which the camera 312 is mounted. In addition, it is assumed that the camera 312 also includes a function of recording sound of the video content. However, when the television receiving device 100 includes a buffer (which will be described later) that temporarily holds video streams and audio streams to be output, the camera 312 is not essential.

The camera 313 is configured as, for example, a panoramic camera or a wide angle camera and photographs an indoor space in which the television receiving device 100 is installed (or an installation environment). Alternatively, the camera 313 may be a camera mounted on a camera table (platform) rotatable around axes of roll, pitch, and yaw, for example. However, when sufficient environment data can be acquired through the environment sensor 330 or environment data itself is not necessary, the camera 310 is not necessary.

The state sensor unit 320 includes one or more sensors that acquire state information with respect to a user state. The state sensor unit 320 intends to acquire, for example, a working state of a user (whether the user watches video content), a behavior state of the user (a movement state such as still, walking, or running, an open/closed state of eyelids, a sight direction, or a pupil size), a mental state (a degree of impression, a degree of excitation, a degree of arousal, emotion, affection, and the like, such as whether the user is absorbed in or concentrating on video content), and a physiological state as state information. The state sensor unit

320 may include various sensors such as a perspiration sensor, a myoelectric potential sensor, an ocular potential sensor, a brain wave sensor, an exhalation sensor, a gas sensor, an ion density sensor, an inertial measurement unit (IMU) that measures a behavior of the user, and a speech sensor (microphone or the like) that collects utterances of the user.

The environment sensor unit 330 includes various sensors that measure information about an environment such as an indoor space in which the television receiving device 100 is installed. For example, the environment sensor 330 includes a temperature sensor, a humidity sensor, an optical sensor, an illuminance sensor, an airflow sensor, an odor sensor, an electromagnetic wave sensor, a geomagnetic sensor, a Global Positioning System (GPS) sensor, and a sound sensor (microphone or the like) that collects ambient sound.

The apparatus state sensor unit 340 includes one or more sensors that acquire an internal state of the television receiving device 100. Alternatively, a circuit component such as the video decoder 208 or the audio decoder 209 may have a function of outputting a state of an input signal, a processing condition of the input signal, and the like to the outside and serve as a sensor that detects an internal state of the apparatus. In addition, the apparatus state sensor unit 340 may detect an operation performed by the user on the television receiving device 100 or other apparatuses or store a history of past operations of the user.

The user profile sensor unit 350 detects profile information of a user who watches video content through the television receiving device 100. The user profile sensor unit 350 may not necessarily be configured as a sensor element. For example, a user profile such as the age and the gender of the user may be detected on the basis of a face image of the user captured using the camera 311, an utterance of the user collected using a speech sensor, and the like. In addition, a user profile acquired through a multi-function information terminal carried by the user, such as a smartphone, may be acquired through a link between the television receiving device 100 and the smartphone. However, the user profile sensor unit 350 need not detect confidential information with respect to privacy or a secret of the user. Further, a profile of the same user need not be detected whenever the user watches video content and user profile information acquired once may be stored in, for example, the EEPROM (described above) in the main control unit 201.

Further, a multi-function information terminal carried by the user, such as a smartphone, may be used as the state sensor unit 320, the environment sensor unit 330, or the user profile sensor unit 350 through a link between the television receiving device 100 and the smartphone. For example, sensor information acquired through sensors built in the smartphone and data managed through applications such as healthcare functions (a pedometer and the like), a calendar or a schedule book/memorandum, mail, and a social network service (SNS) may be added to user state data and environment data.

C. Scene Information Estimation Based on Degree of Gaze

The television receiving device 100 according to the present embodiment can measure or estimate a degree of gaze of a user with respect to video content according to a combination with the sensing function as illustrated in FIG. 3. There are various methods of using a degree of gaze. For example, an information providing device that derives a taste and an object of interest of a user on the basis of a total result of attribute information of content that has been watched by the user and provides viewing support information and value-added information to the user is proposed (refer to PTL 4).

Attribute information of content mentioned here is, for example, the genre, performers, keywords, and the like of the content, and the attribute information can be extracted from, for example, information associated with video content, so-called metadata. In addition, metadata is acquired through various acquisition routes, and there are various cases such as a case in which the metadata is superimposed on the video content, a case in which the metadata is distributed as broadcast data associated with content of a main version of broadcast, and a case in which the metadata is acquired through a route different from a route for broadcast content (e.g., a case in which the metadata of broadcast content is acquired via the Internet). In any case, attribute information of content is assigned to the whole content in many cases on the side of a content producer or distributor.

With respect to attribute information about content in which a user is interested, various applications such as supporting viewing of the user (e.g., automatic recording reservation, recommendation of other content, and the like), feedback and content evaluation for a content producer or distributor, and promotion of sales of related products may be conceived.

However, attribute information about whole content is generally information characterizing the whole content (attribute information included in metadata of the content) and does not necessarily represent attribute information characterizing individual scenes in the content. For a user, information characterizing an individual scene (attribute information or metadata) rather than the information characterizing the whole content may be information for which a user having an interest in that scene has a higher interest level. For example, when a content producer or distributor, an advertisement distributor, and the like perform viewing support, content evaluation, product recommendation, and the like on the basis of a correlation between a result of measurement of a degree of gaze of a user for each scene in content and information characterizing the whole content, there are cases in which an interest of the user cannot be correctly reflected. Accordingly, it is conceivable that content or a product according to attribute information in which the user is not personally interested is recommended. Therefore, to realize more precise content recommendation and the like, it is necessary to acquire information characterizing individual scenes in which the user is interested. However, it is difficult for a content producer to attach different types of attribute information to all scenes at the time of producing content.

Accordingly, in the present description, a technology for extracting a specific scene at which a user gazes in video content, inferring metadata that is information about the specific scene (which may be referred to as a label when a neural network is used in artificial intelligence) according to artificial intelligence, and automatically outputting the metadata will be proposed below.

Figure 4:
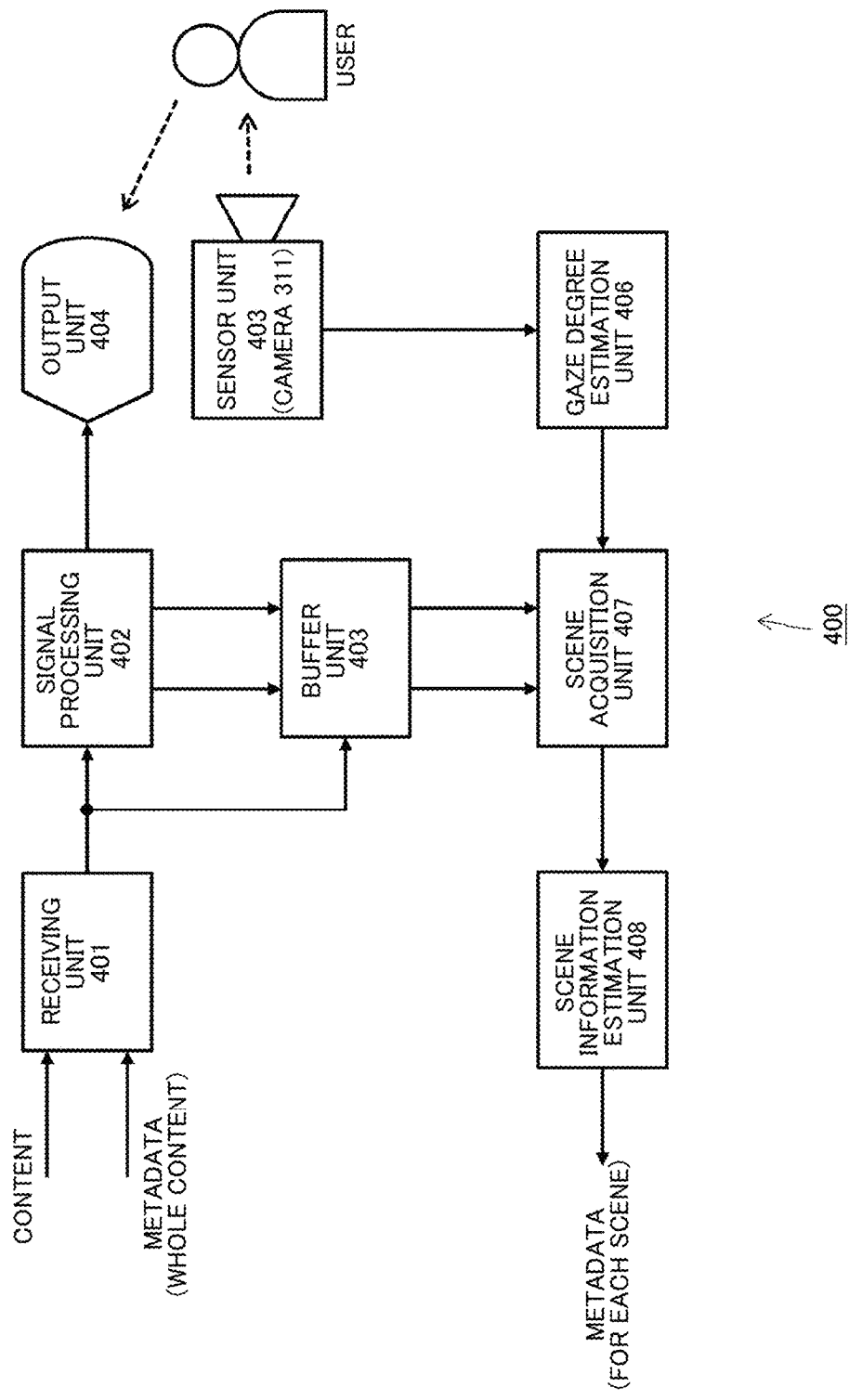
FIG. 4 is a diagram illustrating a configuration example of a scene acquisition and scene information estimation system 400.

FIG. 4 illustrates a configuration example of a scene acquisition and scene information estimation system 400. The illustrated system 400 is configured using components in the television receiving device 100 illustrated in FIG. 2 or external devices (a server device on a cloud and the like) of the television receiving device 100 as necessary.

A receiving unit 401 receives video content and metadata associated with the video content. The video content includes broadcast content transmitted from a broadcasting station (a radio tower, a broadcasting satellite, or the like) and streaming content distributed from a stream distribution server such as an OTT service. In addition, the metadata received by the receiving unit 401 is assumed to be metadata assigned to the whole content on the side of the content producer or distributor. Then, the receiving unit 401 separates (demultiplexes) the received signal into a video stream, an audio stream, and the metadata and outputs them to a signal processing unit 402 and a buffer unit 403 in the subsequent stage.

The receiving unit 401 is composed of, for example, the tuner/demodulation unit 206, the communication interface unit 204, and the demultiplexer 207 in the television receiving device 100.

The signal processing unit 402 is composed of, for example, the video decoder 2080 and the audio decoder 209 in the television receiving device 100, decodes the video data stream and the audio data stream input from the receiving unit 401 and outputs video information and audio information to an output unit 404. In addition, the signal processing unit 402 may output the decoded video data stream and audio data stream to the buffer unit 403.

The output unit 404 is composed of, for example, the display unit 219 and the audio output unit 221 in the television receiving device 100, displays the video information on a screen and outputs the audio information through a speaker or the like.

The buffer unit 403 includes a video buffer and an audio buffer and temporarily holds the video information and the audio information decoded by the signal processing unit 402 only for a certain period. The certain period mentioned here corresponds to, for example, a processing time necessary to acquire a scene at which a user gazes from the video content. The buffer unit 403 may be, for example, the RAM in the main control unit 201 or other buffer memories (not illustrated).

The sensor unit 405 is basically composed of the sensor group 300 illustrated in FIG. 3. However, only the camera 311 that photographs a user who is watching video content is essential and equipment such as other cameras, the state sensor 320, and the environment sensor 330 is arbitrary. For example, the scene acquisition and scene information estimation system 400 illustrated in FIG. 4 includes the buffer unit 403 and thus can identify a scene of video content which is being watched by the user and then record the scene. Accordingly, the camera 312 for recording the display unit 219 of the television receiving device 100 outside the television receiving device 100 is not necessary to identify a scene of video content.

The sensor unit 405 outputs a face image of the user, photographed by the camera 311 while the user is watching the video content output from the output unit 404, to a gaze degree estimation unit 406. In addition, the sensor unit 405 may also output an image captured by the camera 313, state information of the user sensed by the state sensor unit 320, environment information on an indoor space sensed by the environment sensor unit 330, and the like to the gaze degree estimation unit 406.

The gaze degree estimation unit 406 estimates a degree of gaze with respect to the video content that is being watched by the user according to artificial intelligence on the basis of sensor signals output from the sensor unit 405. In the present embodiment, the gaze degree estimation unit 406 basically estimates a degree of gaze of the user according to artificial intelligence on the basis of a recognition result of the face image of the user captured by the camera 311. For example, the gaze degree estimation unit 406 estimates and outputs a degree of gaze of the user on the basis of an image recognition result of a facial expression such as opening user's pupils or opening user's mouth wide. Of course, the gaze degree estimation unit 406 may also receive a sensor signal other than the image captured by the camera 311 and estimate a degree of gaze of the user according to artificial intelligence.

Figure 5:
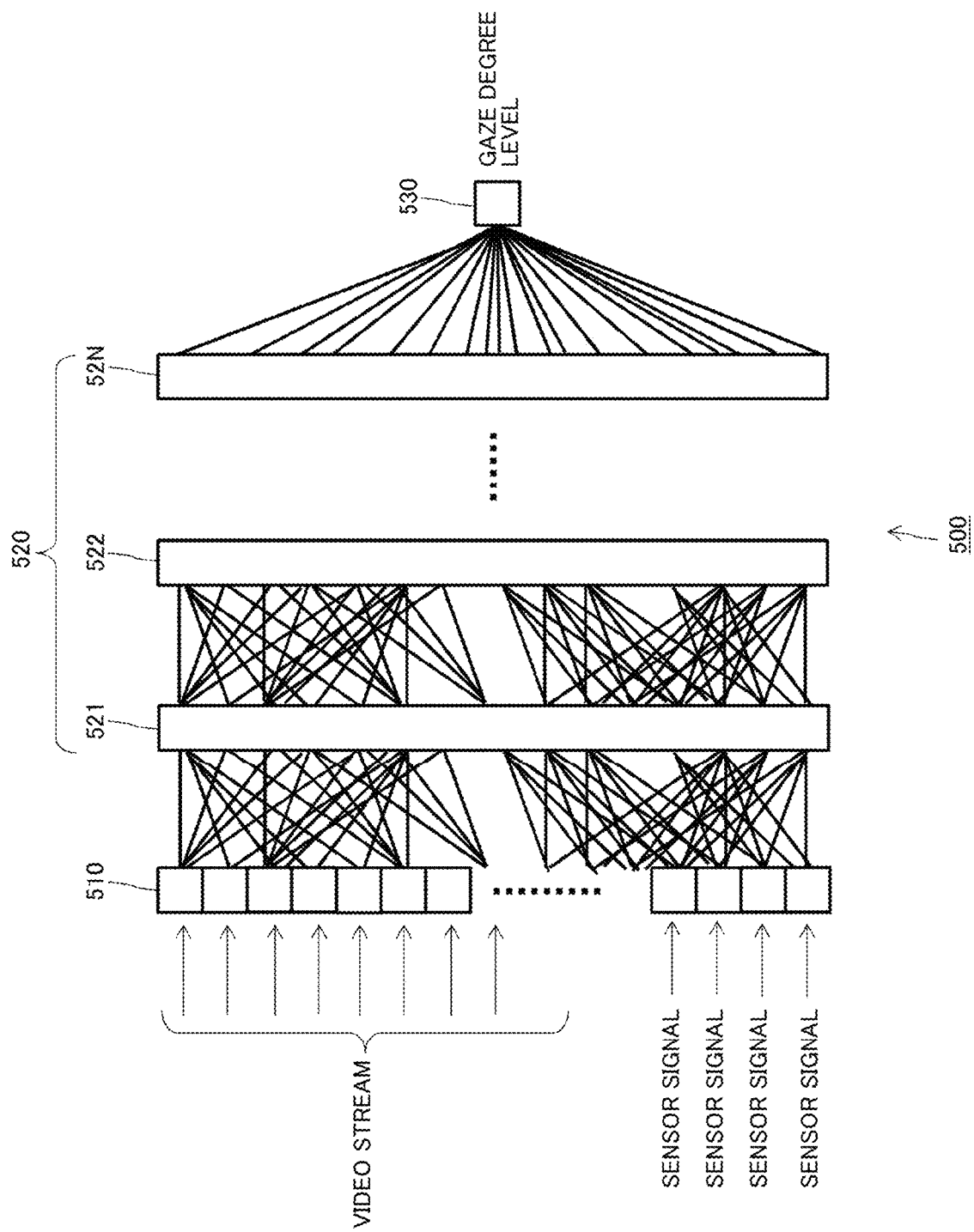
FIG. 5 is a diagram illustrating a configuration example of a neural network 500 used in a gaze degree estimation unit 406.

Since an inference function of artificial intelligence is provided to the gaze degree estimation unit 406, a trained neural network may also be used. FIG. 5 illustrates a configuration example of a gaze degree estimation neural network 500 used in the gaze degree estimation unit 406. The gaze degree estimation neural network 500 includes an input layer 510 that receives an image signal captured by the camera 311 and other sensor signals, middle layers 520, and an output layer 530 that outputs a degree of gaze of a user. In the illustrated example, the middle layer 520 includes a plurality of middle layers 521, 522, . . . and the neural network 500 can perform deep learning. Further, the neural network 500 may have a recurrent neural network (RNN) structure including recurrent combination in the middle layer 520 in consideration of processing of time series information such as moving images and sound.

The input layer 510 includes a moving image stream (or a still image) captured by the camera 311 in an input vector element. Basically, it is assumed that an image signal captured by the camera 311 is input to the input layer 510 in a state in which the image signal is RAW data.

Further, when sensor signals of other sensors are also used to measure a degree of gaze in addition to a captured image of the camera 311, an input node corresponding to each sensor signal is added to the input layer 510 and arranged. In addition, a convolutional newral network (CNN) may be used for input of an image signal and an audio signal, and the like to perform feature point condensation processing.

The output layer includes an output node 530 that outputs a result of estimation of a degree of gaze from an image signal and a sensor signal as a gaze degree level represented by, for example, continuous values (or discrete values) of 0 to 100. When the output node 530 outputs a gaze degree level composed of continuous values, it may be determined that a user "has gazed" or "has not gaze" at a corresponding scene depending on whether the output gaze degree level exceeds a predetermined value. Alternatively, the output node 530 may output discrete values representing that the user "has gazed" or "has not gaze".

In a learning process of the gaze degree estimation neural network 500, a combination of expansion amounts of a face image or other sensor signals and a degree of gaze of the user is input to the gaze degree estimation neural network 500 and a weighting coefficient (inference coefficient) of each node of the middle layer 520 is updated such that the strength of combination of a degree of gaze plausible for the face image or other sensor signals with an output node increases to learn a correlation between the face image of the user (other sensor signals may be included) and the degree of gaze of the user. Then, in a process of using the gaze degree estimation neural network 500 (estimating a degree of gaze), when the face image captured by the camera 311 and other types of sensor information are input to the trained gaze degree estimation neural network 500, a degree of gaze of the user is output with high accuracy.

The gaze degree estimation neural network 500 as illustrated in FIG. 5 is realized, for example, in the main control unit 201. Accordingly, the main control unit 201 may include a processor dedicated for the neural network. Although the gaze degree estimation neural network 500 may be provided through a cloud on the Internet, it is desirable that the gaze degree estimation neural network 500 be disposed in the television receiving device 100 to estimate a degree of gaze for video content in real time.

For example, the television receiving device 100 incorporating the gaze degree estimation neural network 500 trained using an expert teaching database is released. The gaze degree estimation neural network 500 may continuously perform learning using an algorithm such as back propagation. Alternatively, the cloud on the Internet may update a result of learning performed on the basis of data collected from a huge number of users to the gaze degree estimation neural network 500 in the television receiving device 100 installed in each home, which will be described later.

Description of the scene acquisition and scene information estimation system 400 continues with reference to FIG. 4.

A scene acquisition unit 407 acquires, from the buffer unit 403, a video stream and an audio stream of a section determined to be a section at which the user has gazed by the gaze degree estimation unit 406 (or a section in which a gaze degree level exceeds a predetermined value) and metadata with respect to the whole content and outputs the acquired video stream, audio stream, and metadata to a scene information estimation unit 408.

The video stream and the audio stream acquired by the scene acquisition unit 407 from the buffer unit 403 on the basis of a degree of gaze of the user can be said to be a scene at which the user has gazed. On the other hand, the metadata with respect to the whole content does not necessarily correspond to some scene in the content. This is because the user may have a keen interest in a feature that really does not have any meaning in the whole content but is peculiar to a specific scene (e.g., an object reflected only in a specific scene, or the like).

Accordingly, in the scene acquisition and scene information estimation system 400 according to the present embodiment, the scene information estimation unit 408 is configured to receive a video stream and an audio stream of a scene at which the user has gazed, and metadata with respect to the whole content from the scene acquisition unit 407, to estimate (plausible) metadata (also referred to as a label) that characterizes the scene at which the user has gazed according to artificial intelligence, and to output the metadata as information appropriate for the specific scene instead of the whole content.

Figure 6:
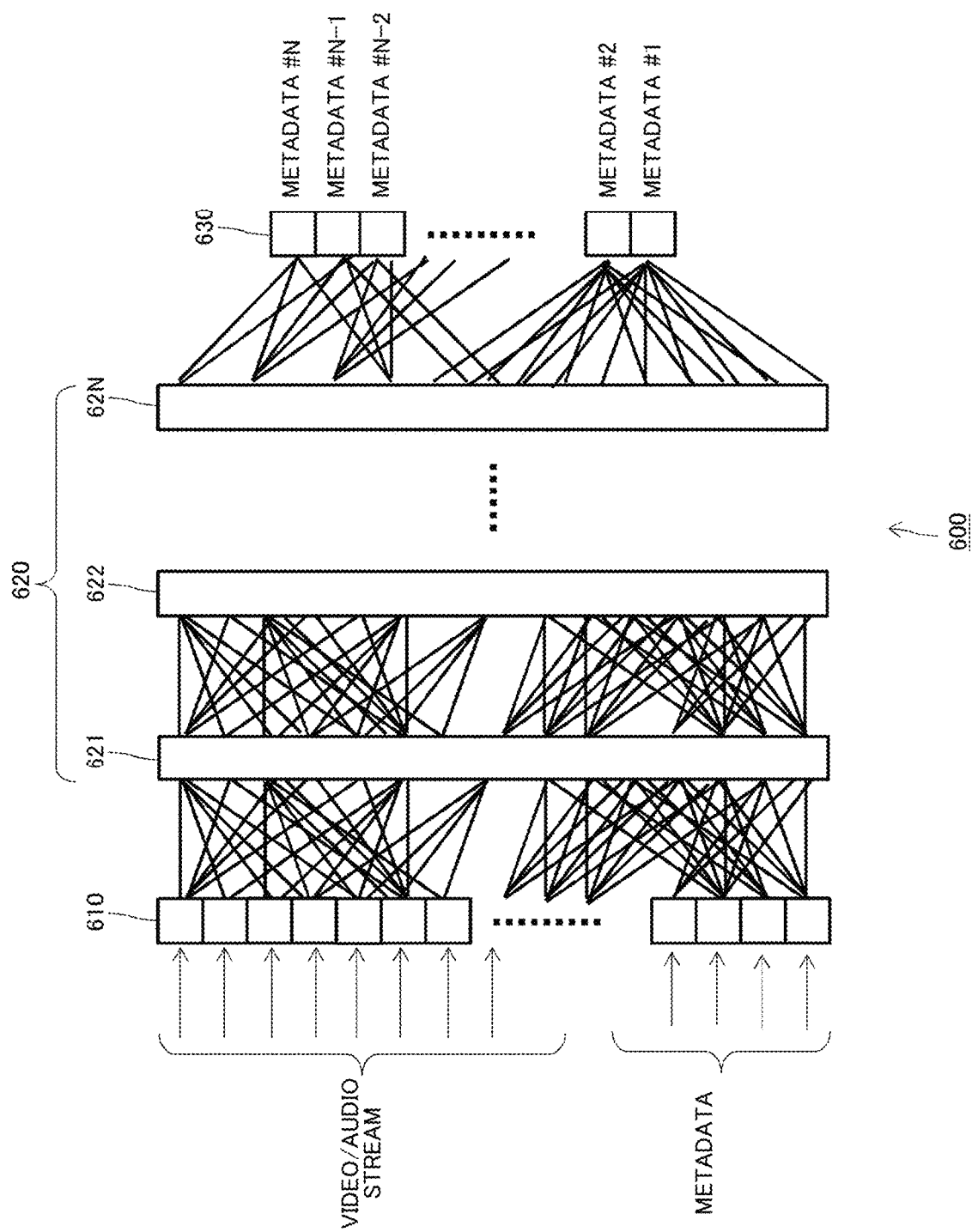
FIG. 6 is a diagram illustrating a configuration example of a neural network 600 used in a scene information estimation unit 408.

A trained neural network may be used for the scene information estimation unit 408 in order to provide the inference function of artificial intelligence. FIG. 6 illustrates a configuration example of a scene information estimation neural network 600 used in the scene information estimation unit 408. The scene information estimation neural network 600 includes an input layer 610 that receives a video stream and an audio stream of a scene at which a user has gazed and metadata of whole content, a middle layer 620, and an output layer 630 that outputs metadata that is information characterizing the scene at which the user has gazed. The middle layer 620 includes a plurality of middle layers 621, 622, . . . and it is desirable that the neural network 600 be able to perform deep learning. Further, an RNN structure including recurrent combination in the middle layer 620 in consideration of time series information such as video streams and audio streams may be employed.

The input layer 610 includes the video stream and the audio stream stored in the buffer unit 403 after being decoded in input vector elements. However, when the buffer unit 403 stores the video stream and the audio stream in RAW data state, the RAW data is input to the input layer 610 as it is. With respect to the audio stream, input waveform signals for respective windows that continue in a time axis direction are included in input vector elements. There may be sections overlapping between consecutive windows. In addition, a frequency signal obtained by performing fast Fourier transform (FFT) processing on a waveform signal for each window may be used as an input vector element.

In addition, the input layer 610 receives metadata that is information characterizing the whole content. When the content is broadcast program content, the metadata includes, for example, text data such as a program name, performer names, a summary of the contents of the program, and keywords. An input node corresponding to each piece of text data is disposed in the input layer 610. Further, feature point condensation processing may be performed on input of an image signal and an audio signal, and the like using a CNN.

Output by which (plausible) metadata (also referred to as a label) that is information characterizing a scene at which a user has gazed can be inferred is generated from the output layer 630. It is assumed that metadata of each scene include information that is not included in the metadata of the original content, such as things reflected in the corresponding scene (e.g., brand names of clothes and ornaments worn by a performer, a store names of a paper cup containing coffee that the performers holds in his/her hand, and a location), the title of BGM, and lines of performers in addition to the metadata of the whole original content, such as a program name, performer names, a summary of the contents of the program, and keywords. An output node corresponding to each piece of text data of the metadata is disposed in the output layer 630. In addition, an output node corresponding to the metadata plausible for the video stream and the audio stream of the scene input to the input layer 610 ignites.

In a learning process of the scene information estimation neural network 600, a weighting coefficient (inference coefficient) of each node of the middle layer 620 including a plurality of layers is updated such that the strength of combination of metadata plausible for the video stream and the audio stream of the scene at which a user has gazed with an output node increases to learn a correlation between the scene and the metadata. Then, in a process of using the scene information estimation neural network 600, that is, in a scene information estimation process, plausible metadata is output with high accuracy for the video stream and the audio stream of the scene at which the user has gazed.

The scene information estimation neural network 600 as illustrated in FIG. 6 is realized, for example, in the main control unit 201. Accordingly, the main control unit 201 may include a processor dedicated for the neural network. For example, the television receiving device 100 incorporating the scene information estimation neural network 600 trained using an expert teaching database is released. The scene information estimation neural network 600 may perform learning using an algorithm such as back propagation. In addition, the cloud on the Internet may update a result of learning performed on the basis of data collected from a huge number of users to the scene information estimation neural network 600 in the television receiving device 100 installed in each home, which will be described later.

Meanwhile, when real time property is not required, the cloud on the Internet may provide the scene information estimation neural network 600.

Gazed scenes of the user, acquired by the scene acquisition unit 407, and metadata (hereinafter also referred to as "metadata of scene") as information characterizing each scene estimated for each scene, output from the scene information estimation unit 408, become final output of the scene acquisition and scene information estimation system 400.

There are various output destinations of gazed scenes of the user and metadata of the scenes according to the scene acquisition and scene information estimation system 400. For example, they may be stored in the television receiving device 100 by which the user has watched content or may be uploaded to a server on the Internet. The server that is an upload destination may be an artificial intelligence server in which the scene information estimation neural network 600 has been constructed or other servers that total metadata. In addition, the gazed scenes of the user and metadata of the scenes may be output to an information terminal such as a smartphone carried by the user. For example, an application (provisionally referred to as "companion application") linked with the scene acquisition and scene information estimation system 400 may be caused to start on the smartphone such that the user can view scenes at which the user has gazed and metadata of the scenes.

In addition, there are various methods of using metadata of scenes at which the user has gazed. For example, the metadata can be used for evaluation of video content watched by the user and recommendation of other video content. Further, the metadata can also be used for marketing such as recommendation of products related to the scenes for the user.

Figure 7:
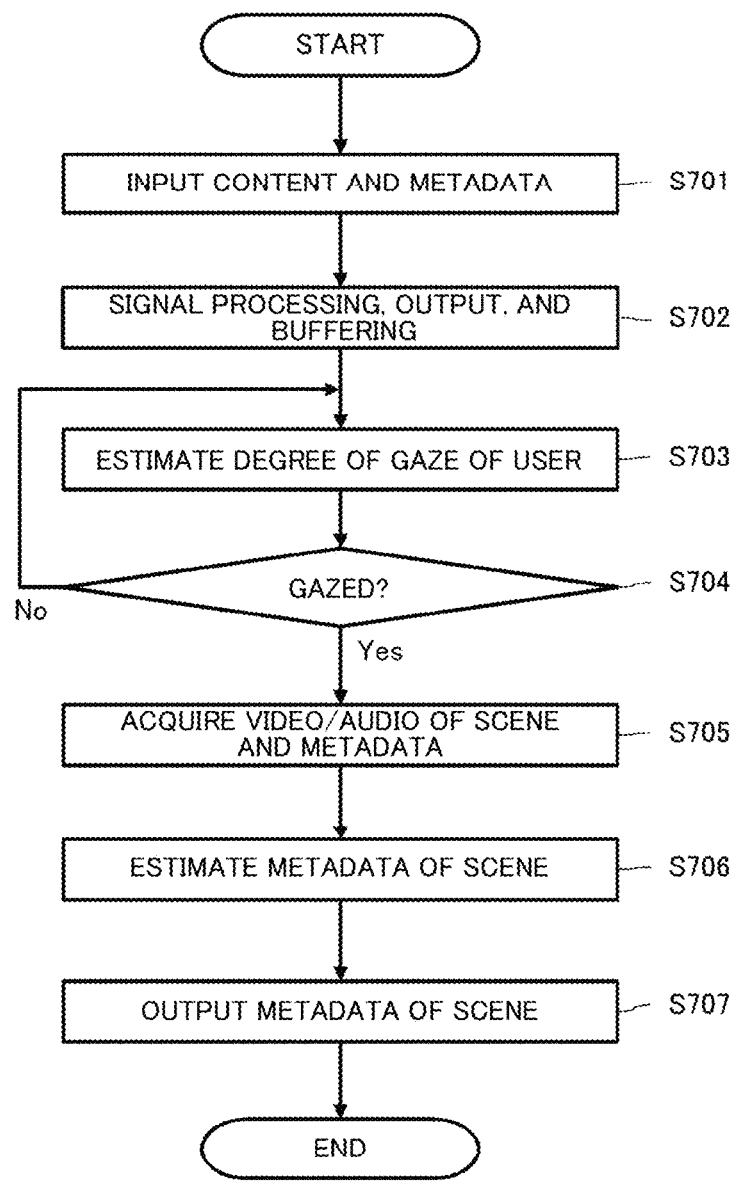
FIG. 7 is a flowchart illustrating a processing procedure performed by the scene acquisition and scene information estimation system 400.

FIG. 7 illustrates a processing procedure for acquiring a scene from video content and outputting metadata that is information characterizing the scene, performed in the scene acquisition and scene information estimation system 400, in the form of a flowchart.

First, the receiving unit 401 receives video content and metadata that is information with respect to the whole content (or attribute data included in the metadata) (step S701). The video content includes broadcast content transmitted from a broadcasting station (a radio tower, a broadcasting satellite, or the like) and streaming content distributed from a stream distribution server such as an OTT service. In addition, the metadata received by the receiving unit 401 is assumed to be metadata assigned to the whole content on the side of the content producer or distributor.

Subsequently, the signal processing unit 402 processes a video stream and an audio stream of the content received by the receiving unit 401, the output unit 404 outputs the video stream and the audio stream, and buffering of the content and the metadata is performed (step S702).

Then, the gaze degree estimation unit 406 estimates a degree of gaze of a user who is watching the content presented by the output unit 404 according to artificial intelligence (Step S703).

The gaze degree estimation unit 406 basically estimates the degree of gaze of the user according to measurement or artificial intelligence on the basis of a result of recognition of a face image of the user captured by the camera 311. The gaze degree estimation unit 406 can also use sensor signals of other sensors in addition to the captured image of the camera 311 for measurement of the degree of gaze. In addition, the gaze degree estimation neural network 500 (refer to FIG. 5) that has learned a correlation between the face image or other types of sensor information and the degree of gaze of the user is used for the gaze degree estimation unit 406 in order to perform estimation according to artificial intelligence.

Subsequently, when the gaze degree estimation unit 406 determines that the user has gazed (Yes in step S70), the scene acquisition unit 407 acquires a video stream and an audio stream of a section at which the user has gazed from the buffer unit 403 as a scene at which the user has gazed, acquires metadata of the whole content from the buffer unit 403, and outputs the video stream, the audio stream, and the metadata to the scene information estimation unit 408 (step S705).

Subsequently, the scene information estimation unit 408 receives the video stream and the audio stream of the scene at which the user has gazed and the metadata with respect to the whole content from the scene acquisition unit 407 and estimates (plausible) metadata characterizing the scene at which the user has gazed according to artificial intelligence (step S706). The scene information estimation neural network 600 (refer to FIG. 6) that has learned a correlation between the scene at which the user has gazed and the metadata plausible for the scene is used for the scene information estimation unit 408 in order to perform estimation according to artificial intelligence.

Then, the scene at which the user has gazed and the (plausible) metadata of the scene which characterizes the scene are output to a predetermined output destination (step S707) and this processing ends.

Figure 8:
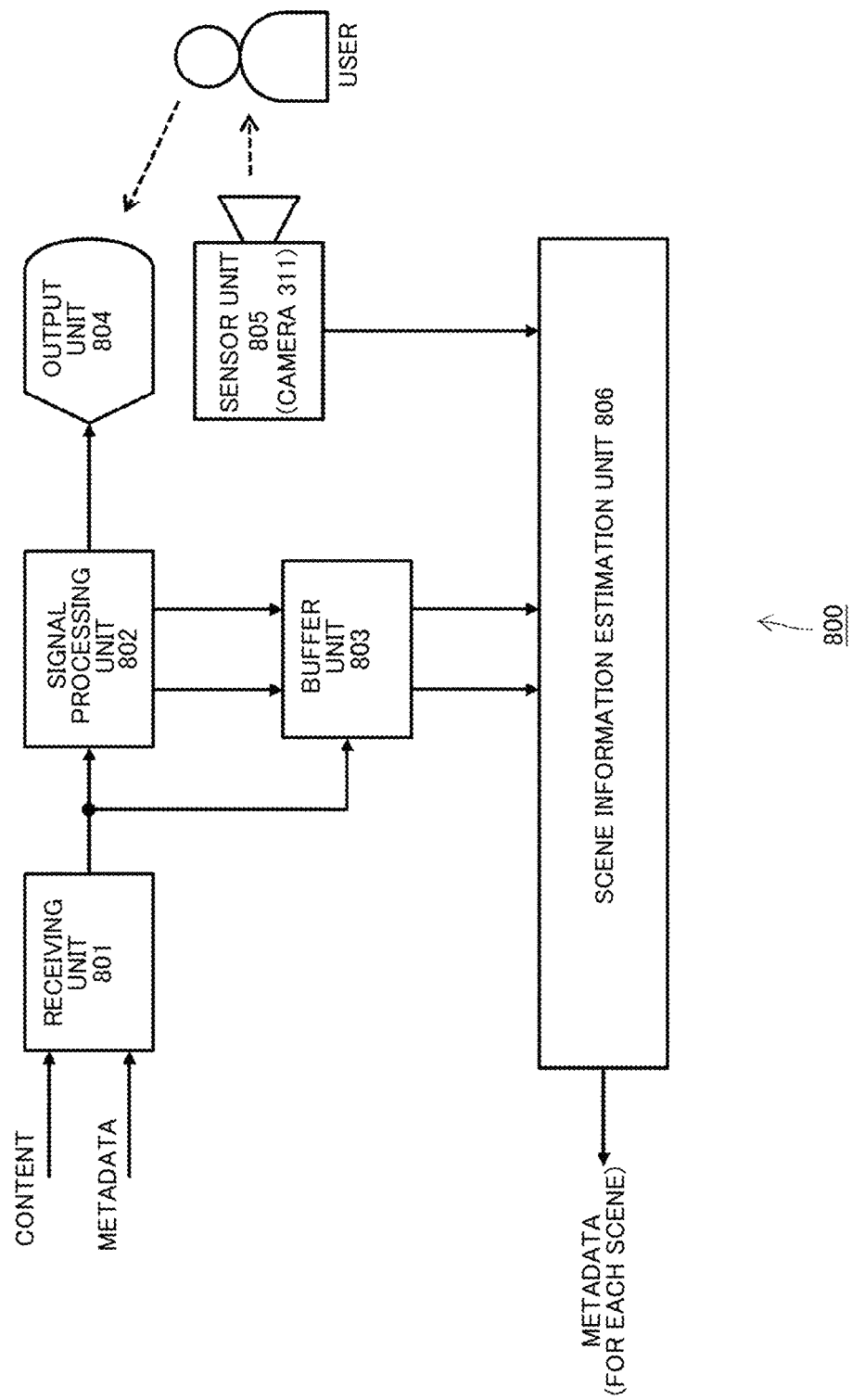
FIG. 8 is a diagram illustrating a modified example of a scene acquisition and scene information estimation system 800.

FIG. 8 illustrates a modified example of a scene acquisition and scene information estimation system 800. The illustrated system 800 is configured using components in the television receiving device 100 illustrated in FIG. 2 or external devices (a server device on a cloud and the like) of the television receiving device 100 as necessary.

Configurations and operations of a receiving unit 801, a signal processing unit 802, a buffer unit 803, an output unit 804, and a sensor unit 805 are the same as those of the scene information estimation system 400 illustrated in FIG. 4 and thus detailed description thereof is omitted here.

The scene information estimation unit 806 collectively realizes processing performed by the gaze degree estimation unit 406, the scene acquisition unit 407, and the scene information estimation unit 408 in the scene information estimation system 400 illustrated in FIG. 4 using a single neural network.

Figure 9:
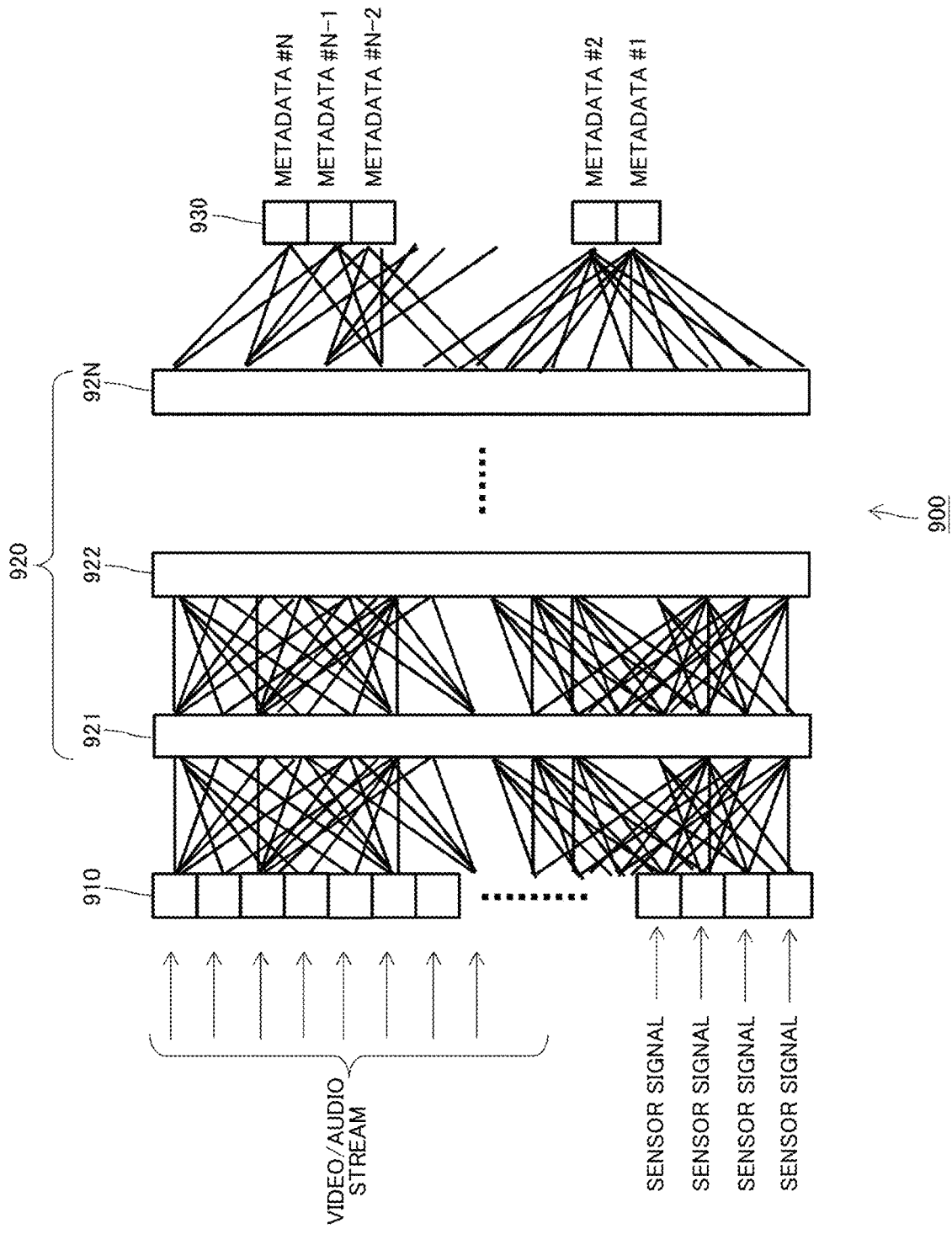
FIG. 9 is a diagram illustrating a configuration example of a neural network 900 used in a scene information estimation unit 806.

FIG. 9 illustrates a configuration example of a scene information estimation neural network 900 used in the scene information estimation unit 806. The scene information estimation neural network 900 includes an input layer 910, a middle layer 920, and an output layer 930. In the illustrated example, the middle layer 920 includes a plurality of middle layers 921, 922, . . . and the scene information estimation neural network 900 can perform deep learning (DL). Further, a recurrent neural network (RNN) structure including recurrent combination in the middle layer 920 in consideration of time series information such as a moving image and sound may be employed.

The input layer 910 includes nodes that receive image signals captured by the camera 311 and other types of sensor information, video streams and audio streams temporarily stored in the buffer unit 803, and metadata of content.

The input layer 910 includes moving image streams (or still image) captured by the camera 311, video streams and audio streams of content, and the like in input vector elements. Basically, it is assumed that an image signal and an audio signal are input to the input layer 910 in a state they are RAW data. With respect to an audio stream, an input waveform signal of each of windows continuing in the time axis direction is used as an input vector input to each node of the input layer 910. There may be sections overlapping between consecutive windows. In addition, a frequency signal obtained by performing FFT processing on a waveform signal for each window may be used as an input vector (as above). Further, a convolutional neural network (CNN) may be used for input of an image signal and an audio signal, and the like to perform feature point condensation processing.

In addition, when metadata composed of text data such as a program name, performer names, a summary of the contents of the program, and keywords of broadcast content is input to the input layer 910, an input node corresponding to each piece of text data is disposed in the input layer 910.

Meanwhile, output by which a scene at which the user has gazed and (plausible) metadata (also referred to as a label) that characterizes the scene can be estimated is generated from the output layer 930. It is assumed that metadata of each scene include information that is not included in the metadata of the original content, such as things reflected in the corresponding scene (e.g., brand names of clothes and ornaments worn by a performer, a store names of a paper cup containing coffee that the performers holds in his/her hand, and a location), the title of BGM, and lines of performers in addition to the metadata of the whole original content, such as a program name, performer names, a summary of the contents of the program, and keywords. Accordingly, an output node corresponding to each piece of text data of the metadata is disposed in the output layer 930. Then, for video streams and audio streams input to the input layer 910, an output node corresponding to a video stream and an audio stream of a scene having a high degree of gaze of the user and metadata plausible for the scene ignites.

In a learning process of the scene information estimation neural network 900, a weighting coefficient (inference coefficient) of each node of the middle layer 920 including a plurality of layers is updated such that the strength of combination of a plausible gazed scene and metadata plausible for the scene with an output node increases to learn correlations between scenes and metadata for a face image or other sensor signals and video streams and audio streams input every moment. Then, in a process of using the scene information estimation neural network 900, that is, in a scene information estimation process, a plausible gazed scene and metadata plausible for the scene are output with high accuracy for the face image or other sensor signals and video streams and audio streams input every moment.

The scene information estimation neural network 900 as illustrated in FIG. 9 is realized, for example, in the main control unit 201. Accordingly, a processor dedicated for the neural network may be included in the main control unit 201 or a processing circuit separate from the main control unit 201. For example, the television receiving device 100 incorporating the scene information estimation neural network 900 trained using an expert teaching database is released. The scene information estimation neural network 900 may perform learning using an algorithm such as back propagation. In addition, the cloud on the Internet may update a result of learning performed on the basis of data collected from a huge number of users to the scene information estimation neural network 900 in the television receiving device 100 installed in each home, which will be described later.

Meanwhile, when real time property is not required, the cloud on the Internet may provide the scene information estimation neural network 900.

A plausible scene at which the user has gazed and metadata plausible for the scene, identified by the scene information estimation unit 806, become final output of the scene acquisition and scene information estimation system 800.

D. Feedback of Scene Information Estimation Result Based on Degree of Gaze

Here, a method of feeding back a scene information estimation result according to the scene acquisition and scene information estimation system 400 to a user will be described along with operation of the scene information estimation system 400.

Figure 10:
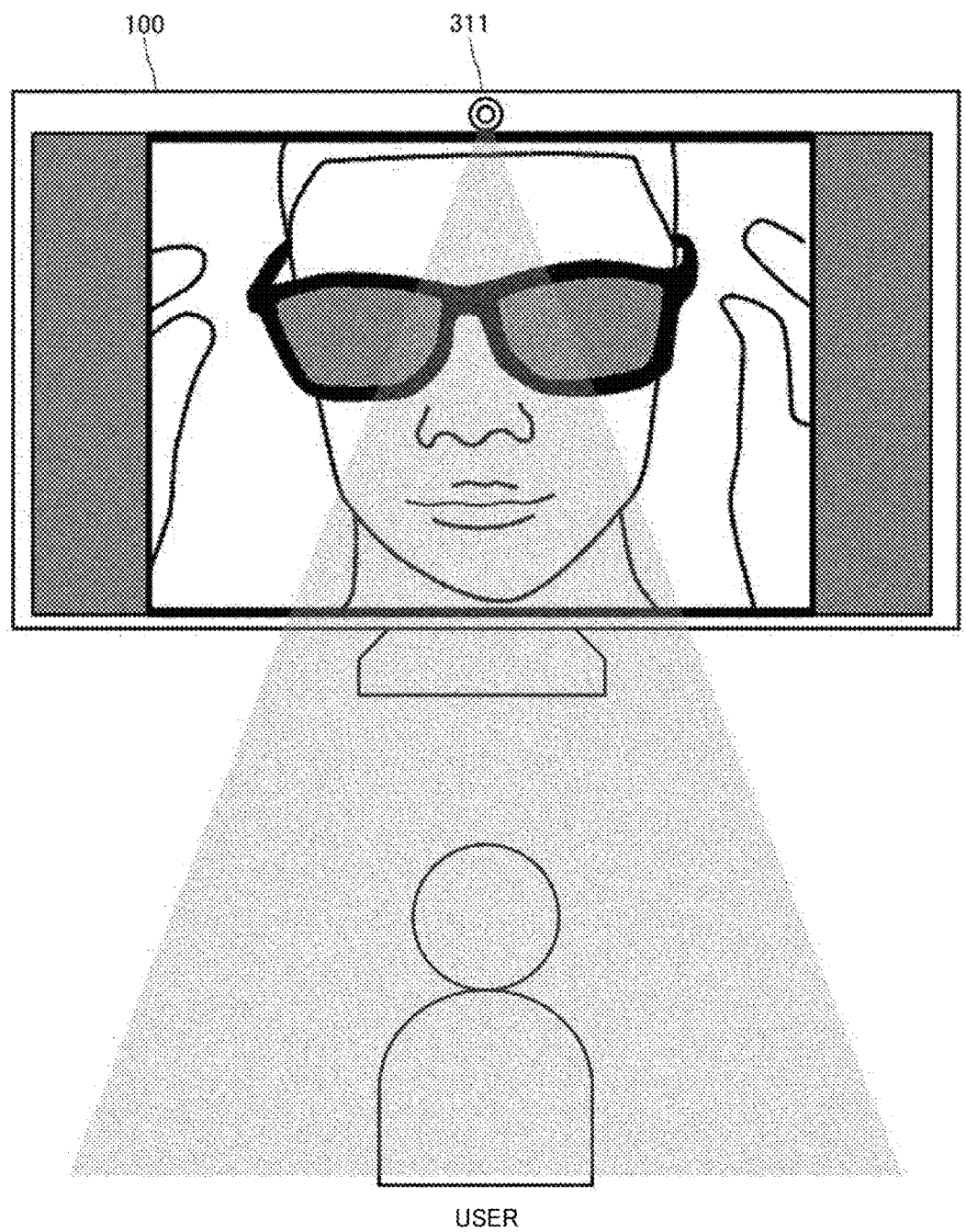
FIG. 10 is a diagram illustrating a state in which a user who is watching television is photographed using a camera.

As illustrated in FIG. 10, a user is continuously photographed, for example, using the camera 311 provided near the center of the upper edge of the screen of the television receiving device 100 while video (broadcast content, a streaming moving image of an OTT service, or the like) is being displayed on the screen.

Figure 11:
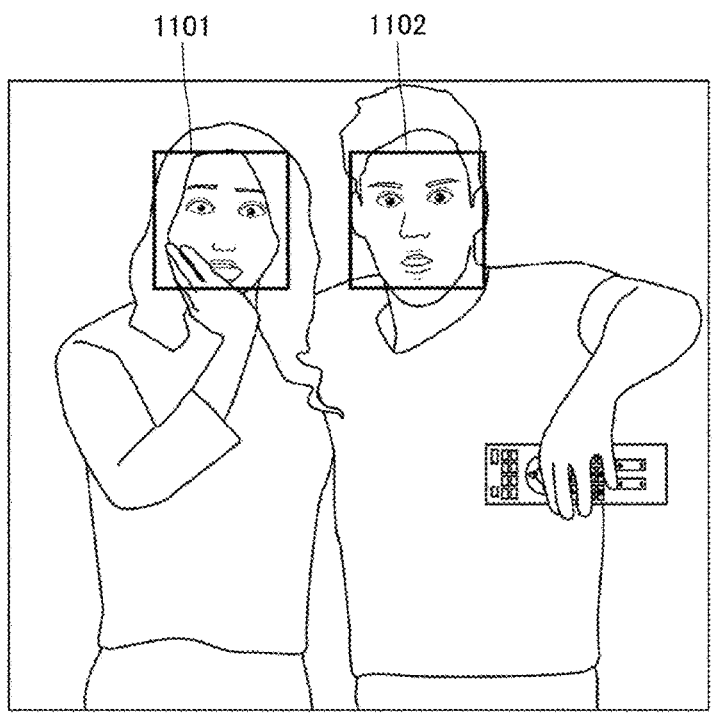
FIG. 11 is a diagram illustrating a state in which face recognition is performed through a captured image from a camera.

The gaze degree estimation unit 406 recognizes a face from a captured image of the camera 311 and measures a degree of gaze of the user. FIG. 11 illustrates a state in which face images 1101 and 1102 of two users are recognized from a captured image of the camera 311. The gaze degree estimation unit 406 performs gaze degree estimation on at least one of the face images 1101 and 1102. To estimate a degree of user's gaze at content according to artificial intelligence, the gaze degree estimation neural network 500 illustrated in FIG. 5 may be used. The gaze degree estimation neural network 500 may estimate a degree of gaze of the user on the basis of sensor signals of other sensors instead of a captured image of the camera 311

Figure 12:
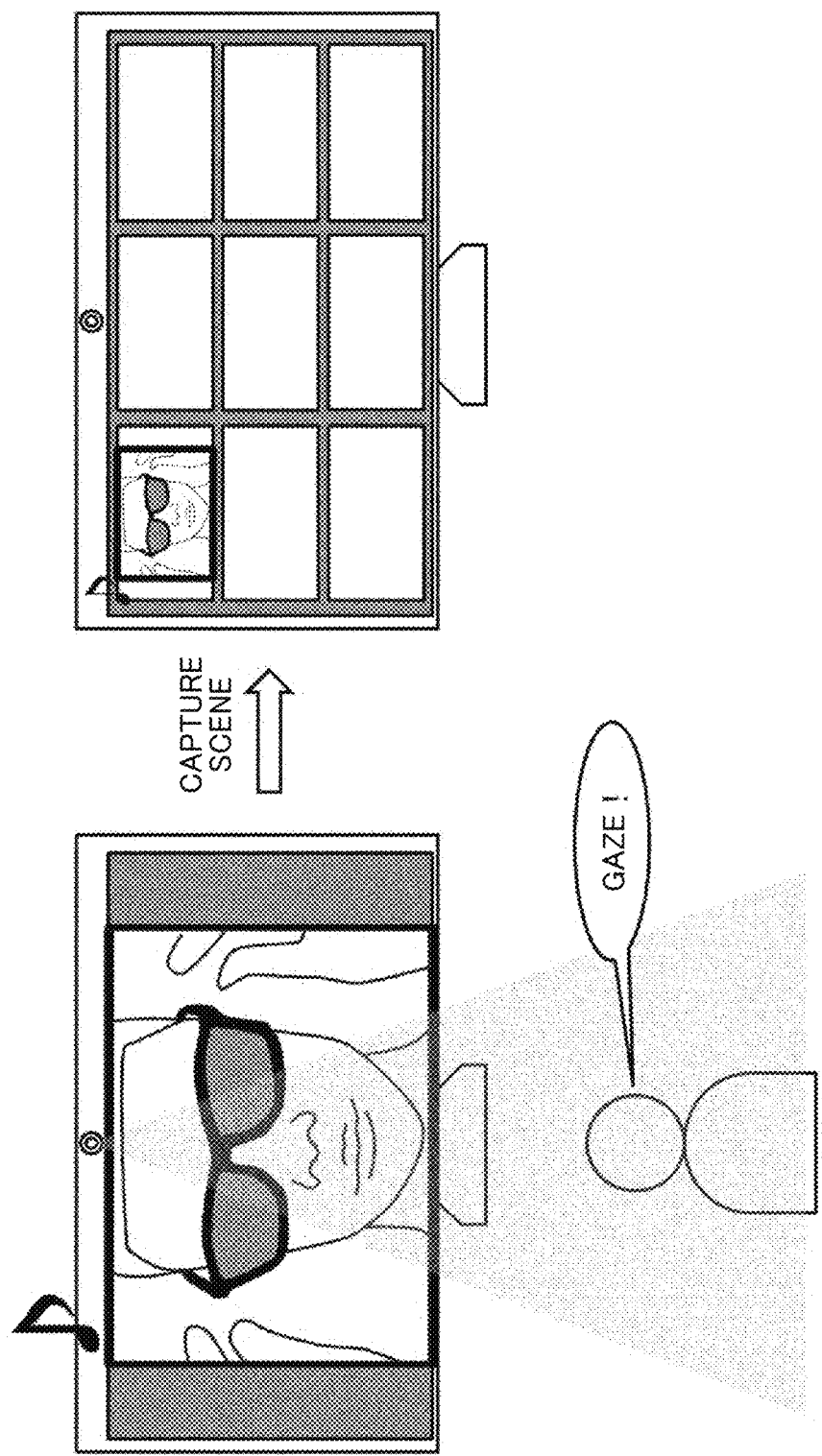
FIG. 12 is a diagram illustrating a state in which a gazed scene is captured according to a result of conjecture of a gaze degree of a user.

When the gaze degree estimation unit 406 estimates that the face image 1101 or 1102 recognized from the captured image of the camera 311 is gazing, a video stream and an audio stream which correspond to a section estimated to be being gazed and are stored in the buffer unit 403 are captured as a scene at which the user is gazing. FIG. 12 illustrates a state in which a gazed scene is captured according to measurement of a degree of gaze of the user.

Gazed scenes of the user and metadata that is information characterizing the scenes, output from the scene acquisition and scene information estimation system 400, are uploaded to a server on the Internet. For example, a content recommendation server searches similar or related content to be recommended to the user on the basis of the gazed scenes of the user and the metadata of the scenes and provides information on recommended content to the user. This type of content recommendation server may search similar or related content on the basis of the gazed scenes of the user using an algorithm such as collaborative filtering (CF) or content based filtering (CBF). Alternatively, the content recommendation server may extract similar or related content using a neural network that has learned a correlation between metadata and content as the aforementioned artificial intelligence server.

Even if the content recommendation server searches similar or related content according to any algorithm, it searches similar or related content on the basis of metadata of a specific scene at which the user has gazed in content instead of the whole content. Accordingly, it is possible to recommend, to the user, content that is less related to metadata with respect to whole content, such as a program name and performers, but is related to detailed matters which are reflected only in a scene at which the user has gazed (e.g., brands of clothes and ornaments such as sunglasses and a watch worn by a performer).

Figure 13:
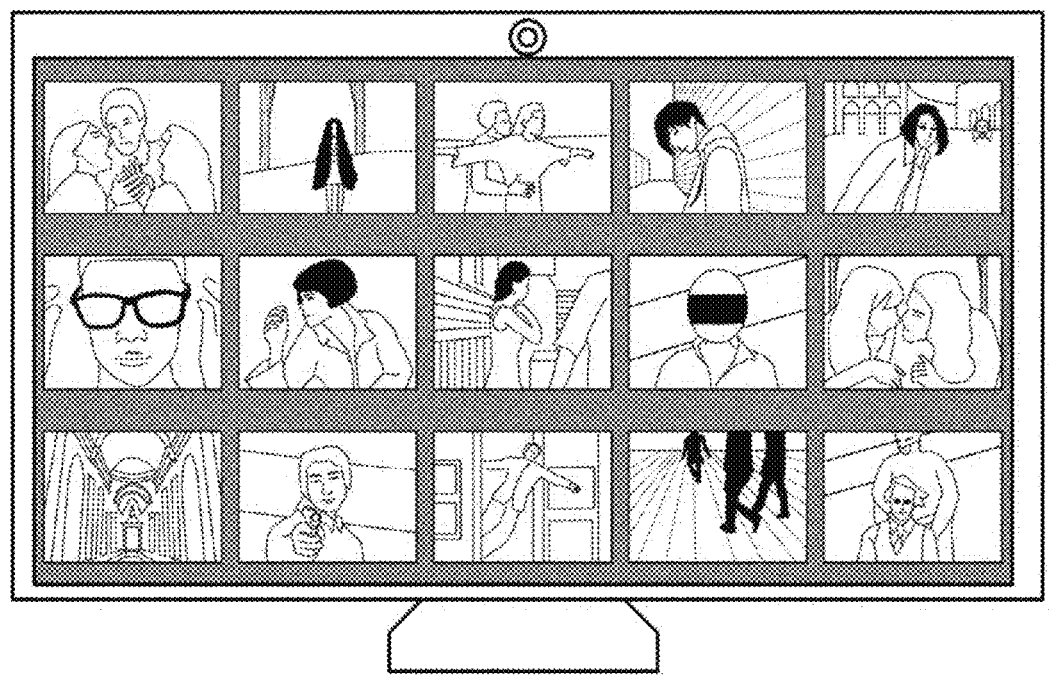
FIG. 13 is a diagram illustrating a configuration example of a list screen of scenes at which a user has gazed.

FIG. 13 illustrates a configuration example of a screen for feeding back scenes at which a user has gazed in the past. In the illustrated screen, a list of representative images of scenes at which the user who has watched video content through the television receiving device 100 has gazed ever is displayed in a matrix form. "Representative image" mentioned here may be, for example, a leading image of a scene taken from content or an image captured in the scene according to a predetermined algorithm or randomly. The display format on the screen is not limited to the matrix form and may be a ring with a virtually infinite length in a line in the horizontal direction or in a line in the vertical direction. Further, the display format may be configured in such a manner that a large number of scenes disposed at arbitrary positions of a three-dimensional space can be displayed on a two-dimensional plane visually displayed when the three-dimensional space is viewed from a predetermined viewpoint and the viewpoint can be changed.

The user can select a representative image of a scene in which he/her is interested from the list, for example, using a cross-key of a remote controller. Then, when the user presses a decision button of the remote controller, for example, while selecting any representative image, selection of the corresponding scene is confirmed. Meanwhile, the aforementioned remote controller operation for selecting a specific scene from the list of representative images can be instructed through audio, for example, using a microphone through an audio agent function of an artificial intelligence (AI) speaker having an artificial intelligence function or the like. Alternatively, the remote controller operation may be performed according to a gesture. The gesture is not limited to hands or the like and all body parts including the head can be used. In addition, when a user put on smartglasses, a line of sight may be recognized and selection and confirmation instruction may be performed according to a gesture using an eye, such as wink. Further, a wireless headphone equipped with a motion sensor and capable of sensing a motion of the head according to an artificial intelligence function may be used. For a wireless apparatus such as the wireless headphone, selection and confirmation instruction may be performed using a touch sensor.

Figure 14:
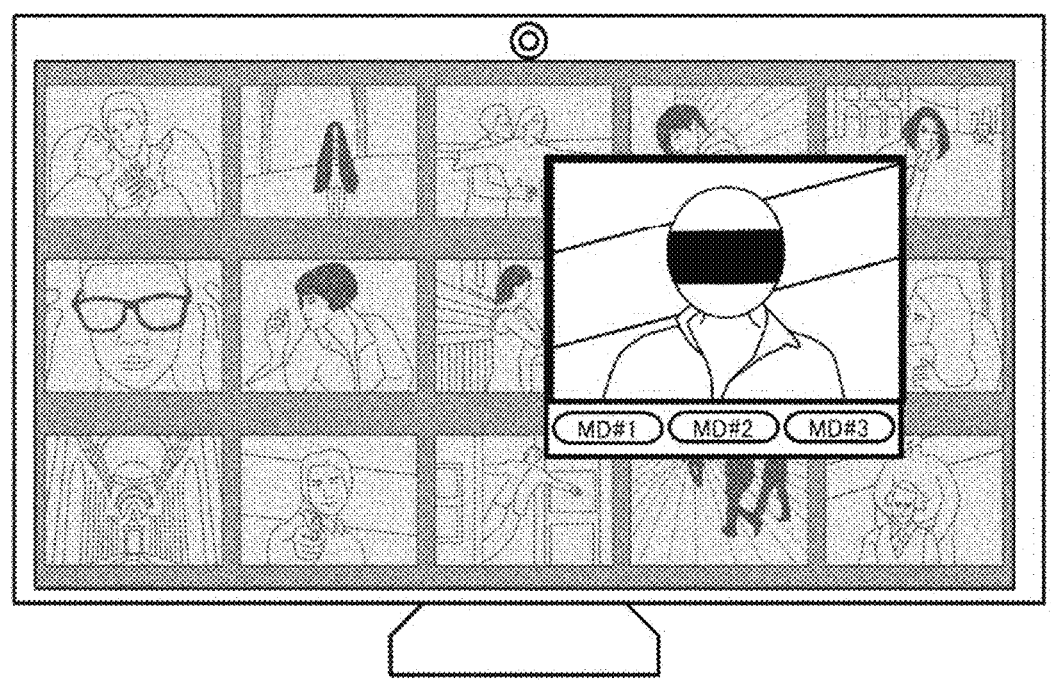
FIG. 14 is a diagram illustrating a configuration example of a screen changed after selection of a scene.

FIG. 14 illustrates a configuration example of a screen changed after a certain representative image is selected. In the illustrated example, a representative image selected by the user from the list of representative images (refer to FIG. 13) is enlarged and displayed and some or all (MD #1, MD #2, . . . ) metadata of the scene which is information estimated by the scene information estimation system 400 for the scene is displayed. At the time of displaying a representative image, a video stream and an audio stream of a section at which the user has gazed may be reproduced and output instead of a still image.

The user can recall memory of a scene gazed in the past by watching a representative image or moving image of a gazed scene. Further, the user can view metadata along with the representative image of the scene at which he/she has gazed to confirm the reason or ground for gazing at the scene. In addition, in a case in which the user wants to change metadata characterizing the scene, automatically assigned to the scene by the scene information estimation unit 408 according to artificial intelligence, and the like, it is possible to edit (change, add, delete, or the like) the metadata through a remote controller operation, an audio agent function, or the like to customize the metadata associated with the scene for personal use.

Figure 15:
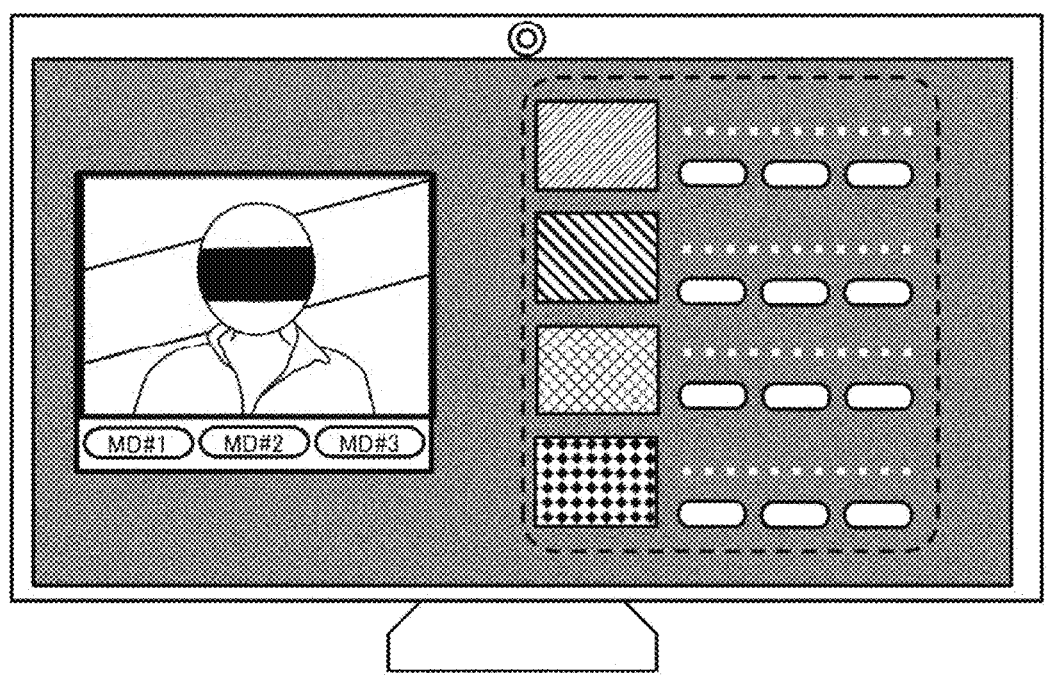
FIG. 15 is a diagram illustrating a configuration example of a screen presenting related content.

Further, the user can instruct presentation of recommended similar or related content on the basis of a selected gazed scene through a remote controller operation or an audio agent. FIG. 15 illustrates a configuration example of a screen for presenting similar or related content recommended on the basis of metadata of a selected scene. A gazed scene of the user and metadata of the scene are displayed in the left half of the illustrated screen. In addition, a list of similar or related content is displayed in the right half of the screen. Representative images and metadata of the similar or related content are displayed in the list of similar or related content. The user can determine whether he/she wants to view each piece of the similar or related content on the basis of the representative images and metadata. Then, when the user finds similar or related content that he/she desires to watch, the user can instruct reproduction of the content through a remote controller operation, an audio agent function, or the like to start watching.

In addition, the user can display feedback of a gazed scene on a small screen of an information terminal such as a smartphone as well as the large screen of the television receiving device 100. For example, the user can start a companion application linked to the scene acquisition and scene information estimation system 400 on the smartphone to view a scene at which the user personally has gazed and metadata of the scene.

Figure 16:
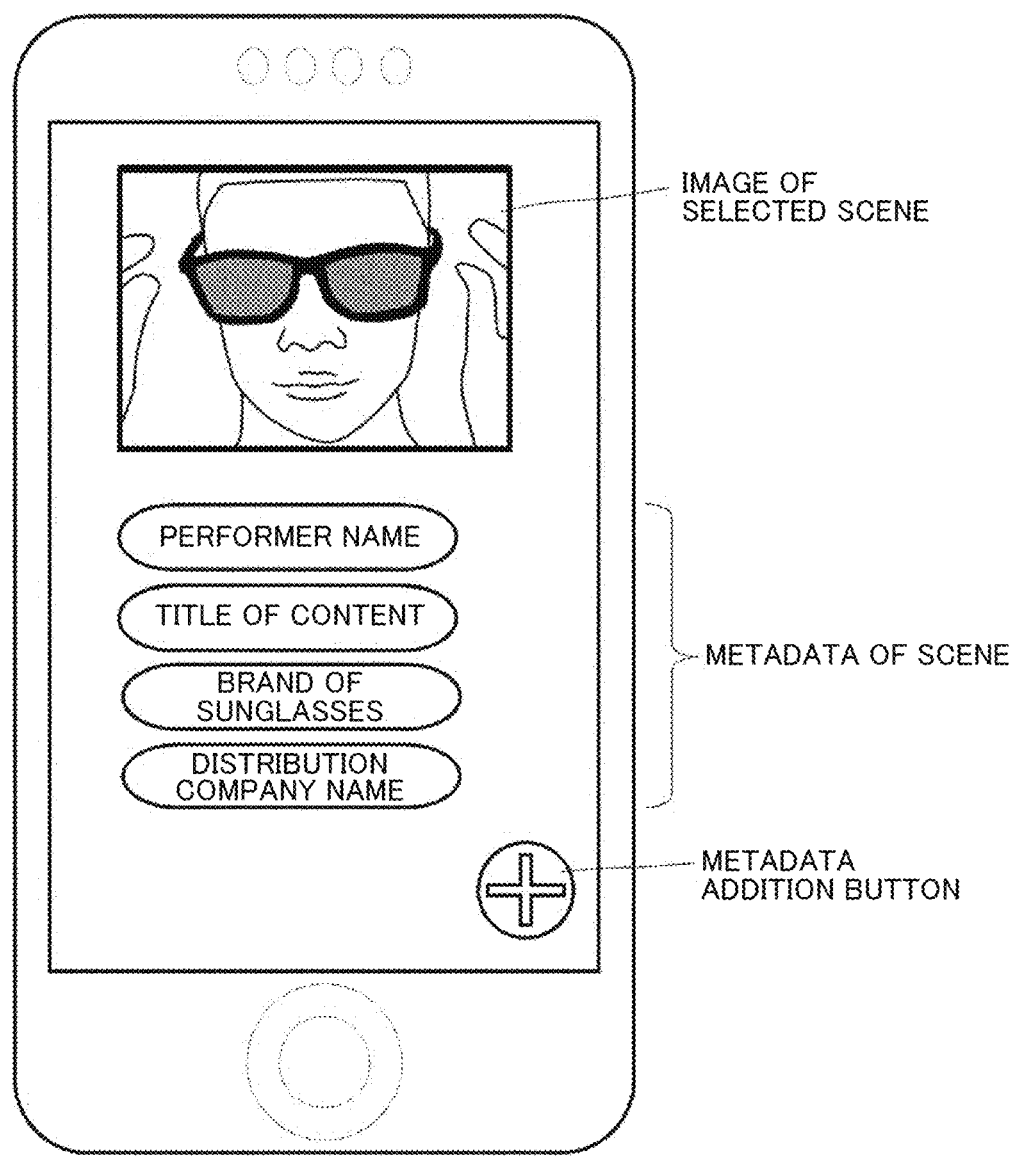
FIG. 16 is a diagram illustrating a state in which a scene at which a user has gazed is fed back to a screen of a smartphone.
Figure 17:
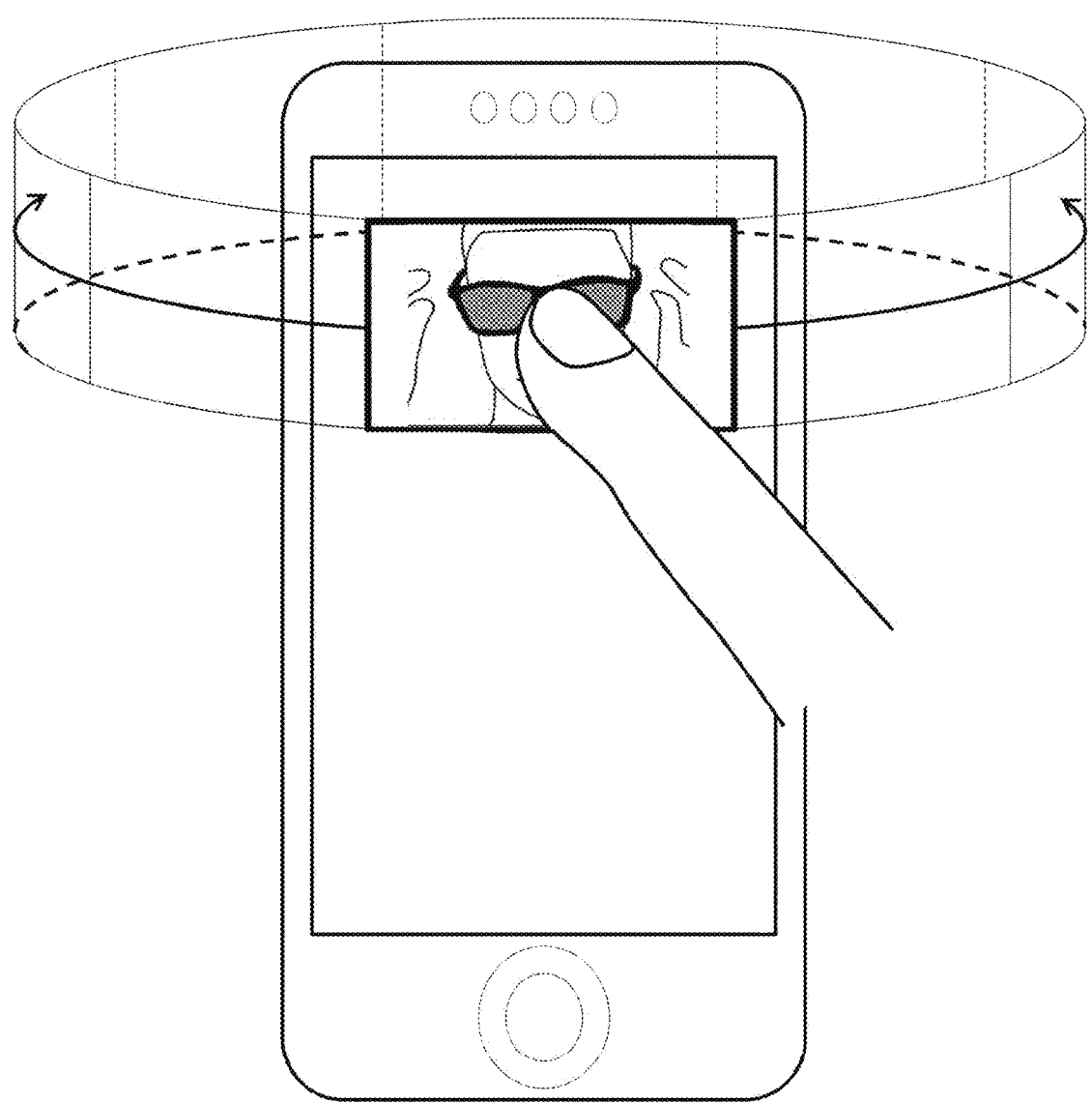
FIG. 17 is a diagram illustrating an example of arrangement of a plurality of scenes.
Figure 18:
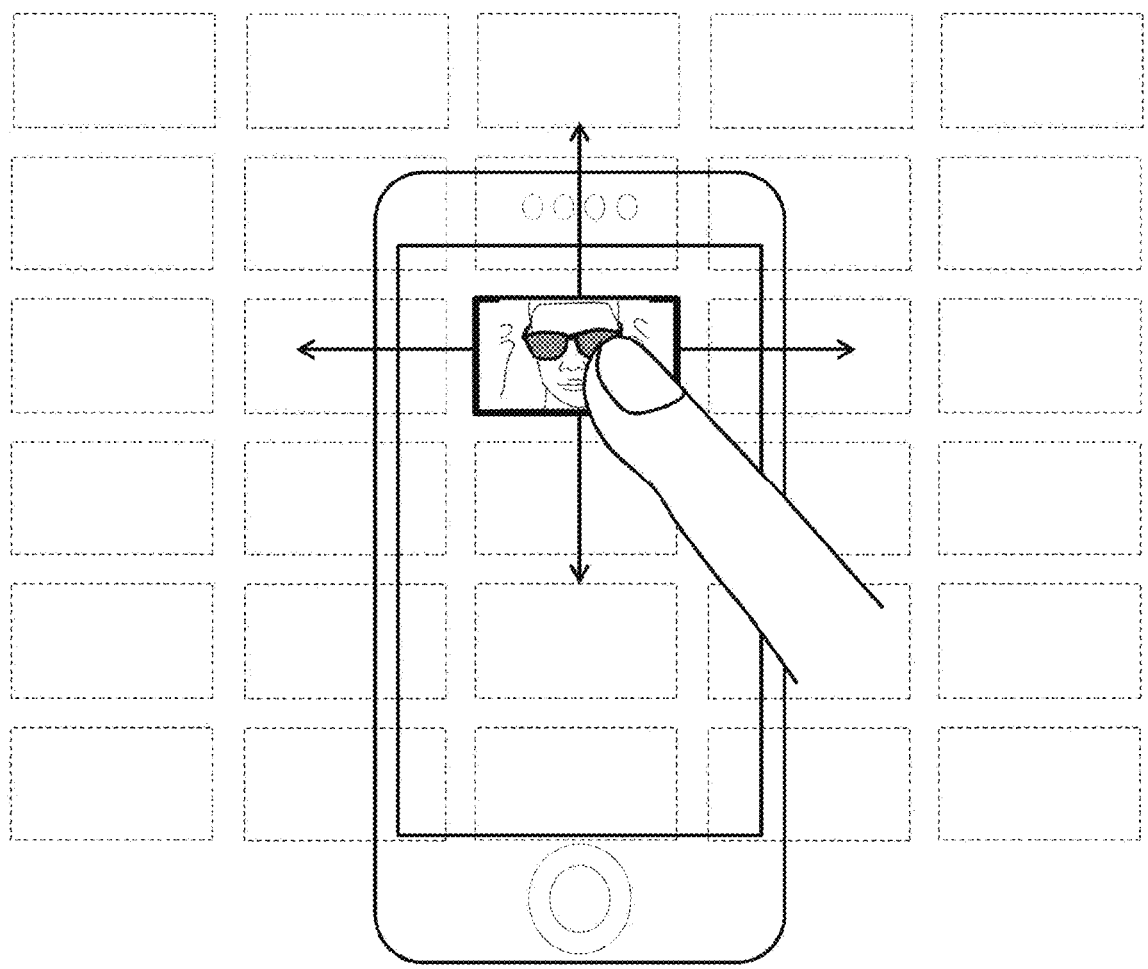
FIG. 18 is a diagram illustrating an example of arrangement of a plurality of scenes.

FIG. 16 illustrates an example of a state in which a scene at which the user has gazed is fed back to the screen of a smartphone. The screen of the smartphone is small and thus representative images of a plurality of scenes cannot be displayed in a list as on the television screen illustrated in FIG. 13. Accordingly, only a representative image of one scene is displayed on one screen. However, representative images of a plurality of scenes may be virtually disposed in a carousel form, for example, as illustrated in FIG. 17 or virtually disposed in a matrix form as illustrated in FIG. 18 and, in response to a flicking operation performed by the user on the representative image displayed on the screen of the smartphone in the horizontal direction or the vertical direction, transition to a representative image neighboring in a direction in which the user performs the flicking operation on the carousel or the matrix may be performed.

Referring back to FIG. 16, the configuration of the feedback screen on the smartphone is described. At the time of displaying the representative image on the screen, a video stream and an audio stream of a section at which the user has gazed may be reproduced and output instead of a still image. Further, some or all metadata estimated by the scene information estimation system 400 for the scene is displayed under the representative image.

According to the scene information estimation system 400 disclosed in the present description, the effect that the user can recall memory of a scene gazed in the past by watching representative images or moving images of gazed scenes is obtained. In addition, according to the scene information estimation system 400 disclosed in the present description, the effect that the user can view metadata along with a representative image of a scene at which he/she has gazed to confirm the reason or ground for gazing the scene is obtained. Further, according to the scene information estimation system 400 disclosed in the present description, the effect that, in a case where the user wants to change the metadata assigned to the scene, and the like, the user can edit (change, add, delete, or the like) the metadata using an editing function of the smartphone using a touch panel is obtained. Moreover, according to the scene information estimation system 400 disclosed in the present description, it is possible to learn a tendency of video content having a high degree of gaze, that is, "degree of satisfaction" of the user by integrating and learning scenes with high degrees of gaze of the user. Accordingly, the effect that a possibility of capable of providing video content with high "degree of satisfaction" to the user through a learning function according to artificial intelligence can be improved is obtained.

E. Update of Neural Network

The gaze degree estimation neural network 500, the scene information estimation neural network 600, and the scene information estimation neural network 900 used in the process of estimating metadata with respect to a scene at which a user has gazed in video content according to artificial intelligence have been described.

These neural networks are used as a function of artificial intelligence and operate in a device that can be directly operated by a user, such as the television receiving device 100 installed in each home, or an operation environment (hereinafter also referred to as a "local environment") such as a home in which the device is installed, for example. One of effects of operating neural networks as a function of artificial intelligence in a local environment is that learning can be easily realized in real time using feedback and the like from a user as teacher data using an algorithm such as back propagation for these neural networks, for example. Feedback from a user is, for example, a degree of gaze of the user, estimated by the gaze degree estimation neural network 500, and evaluation of the user with respect to metadata that is information characterizing a scene estimated by the scene information estimation neural network 600 or 900. User feedback may be simple such as OK (good) and NG (no good), for example. User feedback is input to the television receiving device 100, for example, via the operation input unit 222 or the remote controller, an audio agent that is a form of artificial intelligence, a liked smartphone, or the like. Accordingly, another aspect of the effects of operating such neural networks as a function of artificial intelligence in a local environment is that the neural networks can be customized or personalized for a specific user according to learning using user feedback.

On the other hand, a method of collecting data from a great number of users, accumulating learning of neural networks as a function of artificial intelligence, and updating a neural network in the television receiving device 100 in each home using a result of the learning in one or more server devices operating on the cloud that is an aggregate of server devices on the Internet (hereinafter also referred to as simply "cloud") may be conceived. One of the effects of updating neural networks serving as artificial intelligence through the cloud is that a neural network with higher accuracy can be constructed by performing learning using a large amount of data.

Figure 20:
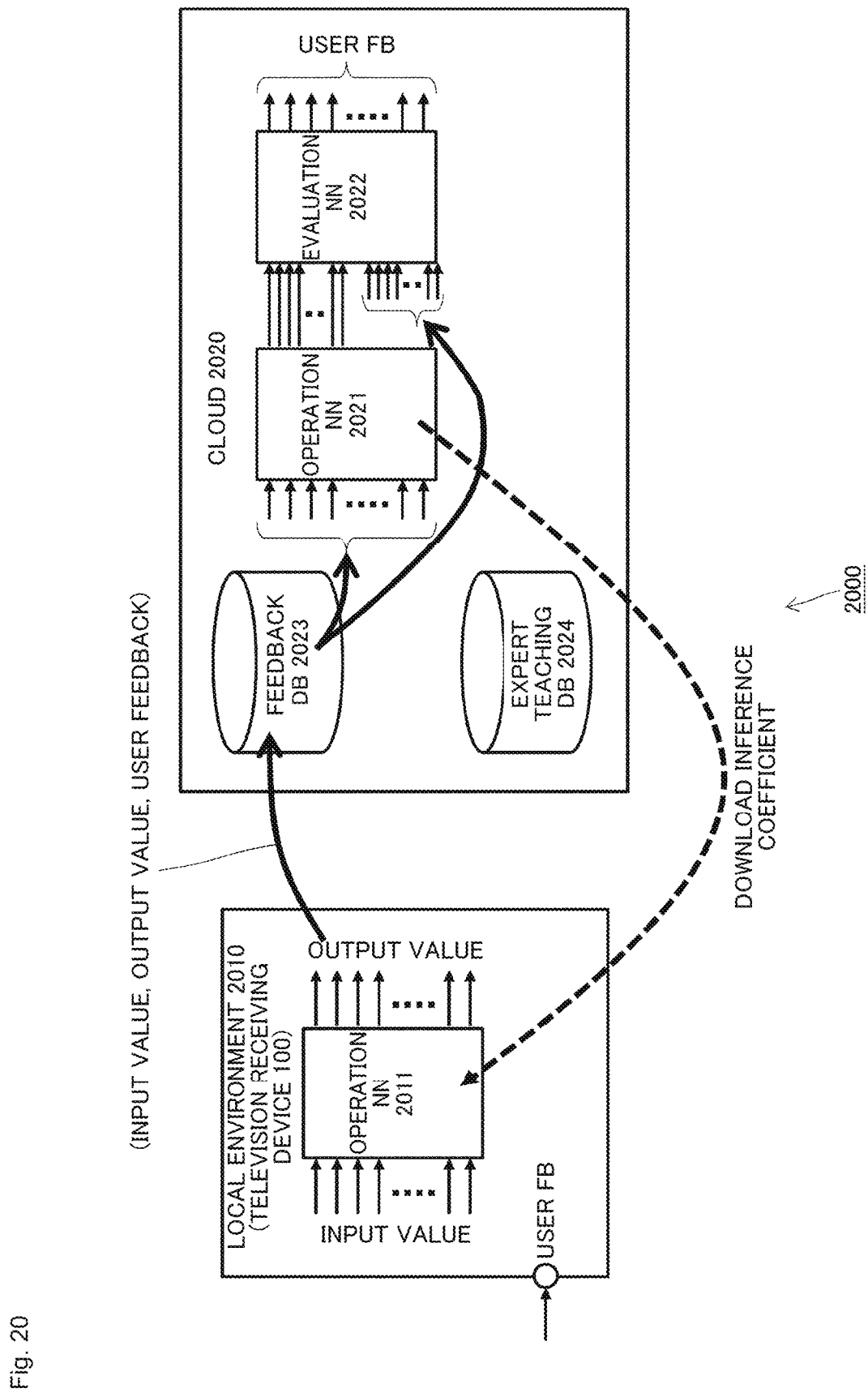
FIG. 20 is a diagram illustrating a configuration example of an artificial intelligence system 2000 using a cloud.

FIG. 20 schematically illustrates a configuration example of an artificial intelligence system 2000 using a cloud. The illustrated artificial intelligence system 2000 using the cloud is composed of a local environment 2010 and a cloud 2020.

The local environment 2010 corresponds to an operation environment (home) in which the television receiving device 100 is installed or the television receiving device 100 installed in a home. Although FIG. 20 shows only a single local environment 2010 for simplification, connection of a great number of local environments to the single cloud 2020 may be conceived in practice. In addition, although the television receiving device 100 or the operation environment such as a home in which the television receiving device 100 operates is mainly exemplified as the local environment 2010 in the present embodiment, the local environment 2010 may be an arbitrary device that can be personally operated by a user, such as a smartphone or a wearable device, or an environment (including public facilities such as stations, bus stops, airports, and shopping centers, and labor facilities such as factories and offices) in which the device operates.

As described above, the gaze degree estimation neural network 500 and the scene information estimation neural network 600 or the scene information estimation neural network 900 are provided in the television receiving device 100 as artificial intelligence. It is assumed that these neural networks mounted in the television receiving device 100 and actually used are commonly referred to as an operation neural network 2011 here. The operation neural network 2011 is assumed to perform learning in advance using expert teaching database including a great amount of sample data.

Meanwhile, the cloud 2020 is equipped with an artificial intelligence server (described above) providing artificial intelligence functions (including one or more server devices). The artificial intelligence server is provided with an operation neural network 2021 and an evaluation neural network 2022 that evaluates the operation neural network 2022. The operation neural network 2021 has the same configuration as that of the operation neural network 2011 provided in the local environment 2010 and is assumed to perform learning in advance using expert teaching database including a great number of sample data. In addition, the evaluation neural network 2022 is a neural network used to evaluate a learning situation of the operation neural network 2021.

On the side of the local environment 2010, the operation neural network 2011 receives sensor information such as a captured image of the camera 311 and a user profile and outputs a degree of gaze suitable for the user profile and metadata of each scene. However, when the operation neural network 2011 is the scene information estimation neural network 600, a video stream of a scene at which the user has gazed and metadata of the original content are input. Here, an input to the operation neural network 2011 is simply referred to as an "input value" and an output form the operation neural network 2012 is simply referred to as an "output value" for simplification.

A user of the local environment 2010 (e.g., a viewer of the television receiving device 100) evaluates an output value of the operation neural network 2011 and feeds back an evaluation result to the television receiving device 100, for example, via the operation input unit 222, the remote controller, an audio agent, a linked smartphone, or the like. Here, user feedback is assumed to be any of OK (0) and NG (1) for simplification of description.

Feedback data including a combination of the input value and the output value of the operation neural network 2011 and the user feedback is transmitted from the local environment 2010 to the cloud 2020. In the cloud 2020, feedback data transmitted from a great number of local environments is accumulated in a feedback database 2023. A great amount of feedback data describing corresponding relations between input values and output values of the operation neural network 2011 and users is accumulated in the feedback database 2023.

In addition, the cloud 2020 can possess or use an expert teaching database 2024 including a great amount of sample data used for prior learning of the operation neural network 2011. Individual piece of sample data is teacher data that describes a corresponding relation between sensor information and a user profile and an output value of the operation neural network 2011 (or 2021).

When feedback data is extracted from the feedback database 2023, an input value (e.g., a combination of sensor information and a user profile) included in the feedback data is input to the operation neural network 2021. In addition, an output value of the operation neural network 2021 and the input value included in the corresponding feedback data (e.g., the combination of the sensor information and the user profile) are input to the evaluation neural network 2022, and the evaluation neural network 2022 outputs user feedback.

In the cloud 2020, learning of the evaluation neural network 2022 as a first step and learning of the operation neural network 2021 as a second step are alternately performed.

The evaluation neural network 2022 is a network that learns corresponding relations between input values to the operation neural network 2021 and user feedback for outputs of the operation neural network 2021 and user feedback. Accordingly, in the first step, the evaluation neural network 2022 receives an output value of the operation neural network 2021 and user feedback included in feedback data corresponding thereto and performs learning such that user feedback output from the evaluation neural network 2022 for the output value of the operation neural network 2021 is consistent with real user feedback for the output value of the operation neural network 2021. As a result, the evaluation neural network 2022 is trained to output the same user feedback (OK or NG) as that of the real user for the output of the operation neural network 2021.

Subsequently, in the second step, the evaluation neural network 2022 is fixed and learning of the operation neural network 2021 is performed. As described above, when feedback data is extracted from the feedback database 2023, an input value included in the feedback data is input to the operation neural network 2021, an output value of the operation neural network 2021 and data of user feedback included in corresponding feedback data are input to the evaluation neural network 2022, and the evaluation neural network 2022 outputs the same user feedback as that of the real user.

At this time, the operation neural network 2021 applies an evaluation function (e.g., loss function) to output from the output layer of the neural network and performs learning using back propagation such that the value is minimized. For example, when user feedback is used as teacher data, the operation neural network 2021 performs learning such that outputs of the evaluation neural network 2022 for all input values become OK (0). By performing learning in this manner, the operation neural network 2021 can output an output value (a degree of gaze, metadata with respect to a scene, or the like) for which the user feeds back OK with respect to any input value (sensor information, a user profile, or the like).

In addition, at the time of learning of the operation neural network 2021, the expert teaching database 2024 may be used as teacher data. Further, learning may be performed using two or more pieces of teacher data such as user feedback and the expert teaching database 2024. In this case, weighting addition may be performed on a loss functions calculated for each piece of teacher data and learning of the operation neural network 2021 may be performed such that a weight addition result is minimized.

Learning of the evaluation neural network 2022 as the first step and learning of the operation neural network 2021 as the second step as described above are alternately performed to improve the accuracy of the operation neural network 2021. Then, inference coefficients in the operation neural network 2021 with accuracy improved according to learning are provided to the operation neural network 2011 in the local environment 2010, and thus the user can acquire the further trained operation neural network 2011.

For example, bitstreams of the inference coefficients of the operation neural network 2011 may be compressed and downloaded from the cloud 2020 to the local environment. When the size of the compressed bitstreams is still large, the inference coefficients may be divided into respective layers or respective regions and the compressed bitstreams may be downloaded a plurality of times.

INDUSTRIAL APPLICABILITY

The technology disclosed in the present description has been described in detail with reference to a specific embodiment. However, it will be apparent to those skilled in the art that modification and substitution of the embodiment can be made without departing from the gist of the technology disclosed in the present description.

Although the present description focuses on the embodiment in which the technology disclosed in the present description is applied a television receiver, the gist of the technology disclosed in the present description is not limited thereto. The technology disclosed in the present description can also be equally applied to various types of content reproduction device which present various reproduced content such as video and audio content to a user.

To sum up, the technology disclosed in the present description has been described according to an illustrative form, but the contents of the present description should not be restrictively construed. The gist of the technology disclosed in the present description should be determined in consideration of the claims Meanwhile, the technology disclosed in the present description may also be configured as follows.

(1) An artificial intelligence information processing device including: a gaze degree estimation unit configured to estimate a degree of gaze of a user who is watching content according to artificial intelligence on the basis of sensor information; an acquisition unit configured to acquire a video of a scene at which the user gazes in the content and information about the content on the basis of an estimation result of the gaze degree estimation unit; and a scene information estimation unit configured to estimate information about the scene at which the user gazes according to artificial intelligence on the basis of the video of the scene at which the user gazes and the information about the content.

(2) The artificial intelligence information processing device according to (1) described above, the device in which the scene information estimation unit estimates information having a correlation with the scene at which the user gazes using a neural network that has learned correlations between video of scenes and the information about the content and information about the scenes as estimation according to artificial intelligence.

(3) The artificial intelligence information processing device according to (1) or (2) described above, the device in which the gaze degree estimation unit estimates a degree of gaze having a correlation with sensor information about the user who is watching the content using a neural network that has learned correlations between sensor information and degrees of gaze of the user as estimation according to artificial intelligence.

(4) The artificial intelligence information processing device according to (3) described above, the device in which the sensor information includes at least a captured image of the user who is watching the content, captured through a camera, and the gaze degree estimation unit estimates a degree of gaze having a correlation with a face recognition result in the captured image using a neural network that has learned correlations between face recognition results and degrees of gaze of the user as estimation according to artificial intelligence.

(5) The artificial intelligence information processing device according to any one of (1) to (4) described above, the device in which the content includes at least one of broadcast content and stream distribution content.

(6) The artificial intelligence information processing device according to any one of (1) to (5) described above, the device in which the information about the scene at which the user gazes is output to the outside.

(7) The artificial intelligence information processing device according to any one of (1) to (6) described above, the device in which the scene at which the user gazes and the information about the scene are presented to the user.

(8) An artificial intelligence information processing device including: an input unit configured to receive sensor information about a user who is watching content; and a scene information estimation unit configured to estimate information having a correlation with a scene at which the user gazes using a neural network that has learned correlations between sensor information, content and information on the content, and information about scenes at which the user gazes.

(9) The artificial intelligence information processing device according to (8) described above, the device in which the sensor information includes at least a captured image of the user who is watching the content, captured through a camera, and the scene information estimation unit estimates information having a correlation with a scene at which the user gazes using a neural network that has learned correlations between face images, content and information on the content, and information about scenes at which the user gazes.

(10) An artificial intelligence information processing method including: a gaze degree estimation step for estimating a degree of gaze of a user who is watching content according to artificial intelligence on the basis of sensor information; an acquisition step for acquiring a video of a scene at which the user gazes in the content and information about the content on the basis of an estimation result in the gaze degree estimation step; and a scene information estimation step for estimating information about the scene at which the user gazes according to artificial intelligence on the basis of the video of the scene at which the user gazes and the information about the content.

REFERENCE SIGNS LIST

100 Television receiving device
201 Control unit
202 Bus
203 Storage unit
204 Communication interface (IF) unit
205 Extended interface (IF) unit
206 Tuner/demodulation unit
207 Demultiplexer
208 Video decoder
209 Audio decoder
210 Caption superimposition decoder
211 Caption decoder
212 Caption compositing unit
213 Data decoder
214 Cache unit
215 Application (AP) control unit
216 Browser unit
217 Sound source unit
218 Video compositing unit
219 Display unit
220 Audio compositing unit
221 Audio output unit
222 Operation input unit
300 Sensor group
310 Camera unit
311, 312, 313 Camera
320 State sensor unit
330 Environment sensor unit
340 Apparatus state sensor unit
350 User profile sensor unit
400 Scene acquisition and scene information estimation system
401 Receiving unit
402 Signal processing unit
403 Buffer unit
404 Output unit
405 Sensor unit
406 Gaze degree estimation unit
407 Scene acquisition unit
408 Scene information estimation unit
500 Gaze degree estimation neural network
510 Input layer
520 Middle layer
530 Output layer
600 Scene information estimation neural network
610 Input layer
620 Middle layer
630 Output layer
800 Scene acquisition and scene information estimation system
801 Receiving unit
802 Signal processing unit
803 Buffer unit
804 Output unit
805 Sensor unit
806 Scene information estimation unit
900 Scene information estimation neural network
910 Input layer
920 Middle layer
930 Output layer
1900 Display
1901 Speaker unit
1902 Stand
1901-1, 1902-2 Exciter
2000 Artificial intelligence system using a cloud
2010 Local environment
2011 Operation neural network
2020 Cloud
2021 Operation neural network
2022 Evaluation neural network
2023 Feedback database
2024 Expert teaching database

The invention claimed is:
1. An artificial intelligence information processing device, comprising:
circuitry configured to:
receive sensor information of a user who watches first content;
apply a first artificial intelligence operation on the received sensor information;
estimate a degree of gaze of the user based on the applied first artificial intelligence operation;

acquire, based on the estimated degree of gaze of the user, a video of a scene at which the user gazes in the first content and first information about the first content;

apply a second artificial intelligence operation on the video of the scene and the first information about the first content;

estimate second information about the scene based on the applied second artificial intelligence operation, wherein the second information about the scene includes first metadata that characterizes the scene;

customize the first metadata-characterizing the scene based on an input of the user;

acquire, based on the scene and the customized first metadata, a plurality of pieces of second content and second metadata corresponding to each piece of second content of the plurality of pieces of second content; and control a display device to display the second metadata and representative images of the plurality of pieces of second content.

2. The artificial intelligence information processing device according to claim 1, wherein
the circuitry is further configured to:
estimate third information about a plurality of scenes based on the second artificial intelligence operation; and
estimate, based on a neural network, the second information about the scene,
the neural network is trained on correlations of a plurality of videos of the plurality of scenes and the third information about the plurality of scenes,
the plurality of scenes includes the scene, and
the plurality of videos includes the video.

3. The artificial intelligence information processing device according to claim 1, wherein
the circuitry is further configured to:
estimate a plurality of degrees of gaze of the user based on the first artificial intelligence operation; and
estimate, based on a neural network, the degree of gaze having a correlation with the sensor information,
the neural network is trained on correlations between the sensor information and the plurality of degrees of gaze of the user, and
the plurality of degrees of gaze includes the degree of gaze.

4. The artificial intelligence information processing device according to claim 3, wherein
the sensor information includes an image of the user who watches the first content,
the circuitry is further configured to estimate, based on the neural network, the degree of gaze having a correlation with a face recognition result of a plurality of face recognition results in the image, and
the neural network is trained on correlations between the plurality of face recognition results and the plurality of degrees of gaze of the user.

5. The artificial intelligence information processing device according to claim 1, wherein the first content includes at least one of broadcast content or stream distribution content.

6. The artificial intelligence information processing device according to claim 1, wherein the circuitry is further configured to control the display device to display the second information about the scene.

7. The artificial intelligence information processing device according to claim 1, wherein the circuitry is further configured to control the display device to display the scene and the second information about the scene.

8. An artificial intelligence information processing device, comprising:
circuitry configured to:
receive sensor information of a user who watches first content;
estimate, based on a first neural network, first information about a scene of a plurality of scenes in the first content at which the user gazes, wherein
the first neural network is trained on correlations between the sensor information, the first content and second information on the first content, and third information about the plurality of scenes at which the user gazes, and
the first information about the scene includes first metadata that characterizes the scene;
customize the first metadata based on an input of the user;
acquire, based on the scene and the customized first metadata, a plurality of pieces of second content and second metadata corresponding to each piece of second content of the plurality of pieces of second content; and
control a display device to display the second metadata and representative images of the plurality of pieces of second content.

9. The artificial intelligence information processing device according to claim 8, wherein
the sensor information includes at least an image of the user who watches is the first content,
the circuitry is further configured to estimate, based on a second neural network, the first information about thescene, and
the second neural network is trained on correlations between face images, the first content and the second information on the first content, and the third information about the plurality of scenes at which the user gazes.

10. An artificial intelligence information processing method, comprising:
receiving sensor information of a user who watches first content;
applying a first artificial intelligence operation on the received sensor information;
estimating a degree of gaze of the user based on the applied first artificial intelligence operation;
acquiring, based on the estimated degree of gaze of the user, a video of a scene at which the user gazes in the first content and first information about the first content;
applying a second artificial intelligence operation on the video of the scene and the first information about the first content;
estimating second information about the scene based on the applied second artificial intelligence operation, wherein the second information about the scene includes first metadata that characterizes the scene;
customizing the first metadata based on an input of the user;
acquiring, based on the scene and the customized first metadata, a plurality of pieces of second content and second metadata corresponding to each piece of second content of the plurality of pieces of second content; and controlling a display device to display the second metadata and representative images of the plurality of pieces of second content.

\* \* \* \* \*